US010981536B2

(12) United States Patent
Wang

(10) Patent No.: US 10,981,536 B2
(45) Date of Patent: Apr. 20, 2021

(54) MULTI-POINT SEAT BELT ASSEMBLY

(71) Applicant: Liang-Hsiung Wang, Tainan (TW)

(72) Inventor: Liang-Hsiung Wang, Tainan (TW)

(*) Notice: Subject to any disclaimer, the term of this patent is extended or adjusted under 35 U.S.C. 154(b) by 55 days.

(21) Appl. No.: 16/105,979

(22) Filed: Aug. 21, 2018

(65) Prior Publication Data
US 2019/0061680 A1 Feb. 28, 2019

(30) Foreign Application Priority Data

Aug. 31, 2017 (TW) .................. 106129821

(51) Int. Cl.
B60R 22/12 (2006.01)
B60R 22/18 (2006.01)
(Continued)

(52) U.S. Cl.
CPC .............. B60R 22/12 (2013.01); B60R 22/02 (2013.01); B60R 22/18 (2013.01); B60R 22/26 (2013.01); B60R 22/30 (2013.01); B60R 22/34 (2013.01); B60R 2022/027 (2013.01); B60R 2022/1806 (2013.01); B60R 2022/1812 (2013.01)

(58) Field of Classification Search
CPC ......... B60R 22/12; B60R 22/26; B60R 22/02; B60R 22/18; B60R 22/30; B60R 22/34; B60R 2022/1812; B60R 2022/027; B60R 2022/1806; B60R 22/42
See application file for complete search history.

(56) References Cited

U.S. PATENT DOCUMENTS 4,962,572 A * 10/1990 Prentkowski ...... A44B 11/2557
24/196
5,050,274 A * 9/1991 Staniszewski ......... A44B 11/10
24/171
(Continued)

FOREIGN PATENT DOCUMENTS

CN 203860573 U 10/2014
CN 104709125 A 6/2015
(Continued)

OTHER PUBLICATIONS

Machine Translation of JP-2004136768-A (Year: 2004).*
European Patent Office Search Report and Opinion of corresponding EP Application No. 18190204, dated Oct. 30, 2018.

Primary Examiner — James A English
Assistant Examiner — Kurtis Nielson
(74) Attorney, Agent, or Firm — Pai Patent & Trademark Law Firm; Chao-Chang David Pai

(57) ABSTRACT

A multi-point seat belt assembly has a buckle assembly, two webbing-locking mechanisms, two main webbings, and at least one retractor. The buckle assembly has a buckle member and a tongue member detachably inserted into the buckle member. The webbing-locking mechanisms are mounted on the buckle assembly, and each webbing-locking mechanism has a connecting member and a movable member mounted moveably on the connecting member. The connecting members of the two webbing-locking mechanisms are connected respectively with the buckle member and the tongue member. The main webbings are mounted respectively through the webbing-locking mechanisms and each main webbing has an end. The at least one retractor is connected with the ends of the two main webbings.

3 Claims, 28 Drawing Sheets

(51) Int. Cl.
*B60R 22/30* (2006.01)
*B60R 22/26* (2006.01)
*B60R 22/02* (2006.01)
*B60R 22/34* (2006.01)

(56) References Cited

U.S. PATENT DOCUMENTS

| | | | | |
|---|---|---|---|---|
| 5,138,749 | A | * 8/1992 | McCune | A44B 11/2557 24/170 |
| 5,983,463 | A | * 11/1999 | Prentkowski | A44B 11/2557 24/171 |
| 6,305,713 | B1 | 10/2001 | Pywell et al. | |
| 6,309,024 | B1 | * 10/2001 | Busch | B60R 22/00 24/170 |
| 8,684,414 | B1 | 4/2014 | McBride | |
| 10,259,423 | B2 | * 4/2019 | Friedman | B60N 2/2812 |
| 2004/0036345 | A1 | 2/2004 | Herberg et al. | |
| 2004/0207246 | A1 | * 10/2004 | Delventhal | A44B 11/2549 297/484 |
| 2009/0256337 | A1 | 10/2009 | Pan | |
| 2009/0309346 | A1 | 12/2009 | Van Druff et al. | |
| 2012/0019042 | A1 | * 1/2012 | Park | B60R 22/02 297/477 |
| 2013/0341994 | A1 | * 12/2013 | Boughner | A44B 11/2569 297/468 |
| 2015/0296927 | A1 | * 10/2015 | Ha | B60R 22/12 24/593.1 |
| 2017/0129451 | A1 | 5/2017 | Bittner et al. | |
| 2019/0135224 | A1 | * 5/2019 | Krambeck | B60R 22/1855 |

FOREIGN PATENT DOCUMENTS

| | | | |
|---|---|---|---|
| CN | 205131181 U | 4/2016 | |
| CN | 205385916 U | 7/2016 | |
| CN | 206202229 U | 5/2017 | |
| CN | 107757549 A | 3/2018 | |
| EP | 2660108 A1 | 11/2013 | |
| JP | 57-145441 | 9/1982 | |
| JP | 61-271154 A | 12/1986 | |
| JP | H5-184412 A | 7/1993 | |
| JP | 2000-16234 A | 1/2000 | |
| JP | 2004-136768 A | 5/2004 | |
| JP | 2004136768 A | * 5/2004 | B60R 22/30 |
| JP | 2007-508181 A | 4/2007 | |
| JP | 2013-043621 A | 3/2013 | |
| JP | 2014-019294 A | 2/2014 | |
| KR | 10-1402186 BI | 6/2014 | |
| WO | 2016093065 A1 | 6/2016 | |

* cited by examiner

MULTI-POINT SEAT BELT ASSEMBLY

BACKGROUND OF THE INVENTION

1. Field of the Invention

The present invention relates to a seat belt assembly, and more particularly to a multi-point seat belt assembly that has at least four securing points and a simplified structure.

2. Description of Related Art

Conventional seat belts for different vehicles include many kinds, and a multi-point seat belt assembly is usually applied in a vehicle that requires higher level of safety, such as sport utility vehicles, racing cars or tanks. With the multi-point seat belt assembly, a driver or passenger can be secured on the seat with a sufficient protective effect to the driver or passenger when an external force is applied to the vehicle.

Conventional multi-point seat belt assemblies include four-point, five-point, six-point, and seven-point types. With reference to FIGS. 26 and 27, a conventional five-point seat belt assembly 50 comprises a buckle assembly and five webbings 53. The buckle assembly comprises a buckle member 51 and five tongues 52 inserted into the buckle member 51. The webbings 53 are connected respectively with the tongues 52 and are arranged around a vehicle seat. With such an arrangement, a driver or a passenger can be securely held on the seat. With reference to FIG. 28, a conventional six-point seat belt assembly 60 comprises a buckle assembly and six webbings 64. The buckle assembly comprises a buckle member 61 and a tongue member 62. The tongue member 62 comprises a tongue 63. The six webbings 64 are connected with the buckle member 61 and the tongue member 62 and are arranged around a vehicle seat.

However, in the conventional multi-point seat belt assembly, three webbings are sewn with the buckle member and three webbings are sewn with the tongue member. Therefore, the conventional multi-point seat belt assembly cannot adjust webbing length to fasten users of different body shapes. To adjust the length of the webbing, an adjusting member is mounted on the webbing of the conventional seat belt assembly. With reference to FIGS. 26 and 27, at least three of the five webbings 53 are provided with adjusting members 54. With reference to FIG. 28, at least four webbings 64 are provided with adjusting members 65. With the arrangement of the adjusting members 54,65, the lengths of the webbings 53,64 can be adjusted to allow the seat belt assembly to securely fasten a user on a seat.

In use of the conventional multi-point seat belt assembly, the tongue member is inserted into the buckle member, and the buckle assembly is moved to a position that is adjacent to a center of pelvic of the user. The adjusting members on the webbings are moved to positions to securely fasten the user by the seat belt assembly.

However, the webbings of the conventional multi-point seat belt assembly have to be adjusted in length individually, so the use of the conventional multi-point seat belt assembly is inconvenient. The conventional multi-point seat belt assembly has to sew the each webbing to buckle member and tongue member, and at least three or four adjusting members are needed. Thus, the cost of manufacturing the conventional multi-point seat belt assembly is high.

In addition, the webbings of the conventional multi-point seat belt assembly may be loosened from the user due to the vibrations during driving, so the seat belt assembly will not securely hold the user on the seat. When an emergency brake takes place, the user may move relative to the seat due to inertia, so the conventional multi-point seat belt assembly is not safe in use.

To overcome the shortcomings, the present invention tends to provide a multi-point seat belt assembly to mitigate or obviate the aforementioned problems.

SUMMARY OF THE INVENTION

The main objective of the invention is to provide a multi-point seat belt assembly that is convenient in use, has a simplified structure, and has lower costs.

The multi-point seat belt assembly has a buckle assembly, two webbing-locking mechanisms, two main webbings, and at least one retractor. The buckle assembly has a buckle member and a tongue member detachably inserted into the buckle member. The webbing-locking mechanisms are mounted on the buckle assembly, and each webbing-locking mechanism has a connecting member and a movable member mounted moveably on the connecting member. The connecting members of the two webbing-locking mechanisms are connected respectively with the buckle member and the tongue member. The main webbings are mounted respectively through the webbing-locking mechanisms and each main webbing has an end. The at least one retractor is connected with the ends of the two main webbings.

Alternatively, the multi-point seat belt assembly has a buckle assembly, two webbing-locking mechanisms, two main webbings, at least one retractor, and a connecting webbing. The buckle assembly has a buckle member and two tongue members detachably inserted into the buckle member. The webbing-locking mechanisms are mounted on the buckle assembly, and each webbing-locking mechanism has a connecting member and a movable member mounted moveably on the connecting member. The connecting members of the two webbing-locking mechanisms are connected respectively with the two tongue members. The main webbings are mounted respectively through the webbing-locking mechanisms and each main webbing has an end. The at least one retractor is connected with the ends of the two main webbings. The connecting webbing is connected with a bottom of the buckle member.

Alternatively, the multi-point seat belt assembly has a buckle assembly, two webbing-locking mechanisms, two main webbings, at least one retractor, and a connecting webbing. The buckle assembly has a buckle member, a first tongue member, and a second tongue member. The first tongue member and the second tongue member are detachably inserted into the buckle member. The webbing-locking mechanisms are mounted on the buckle assembly, and each webbing-locking mechanism has a connecting member and a movable member mounted moveably on the connecting member. The connecting members of the two webbing-locking mechanisms are connected respectively with the buckle member and the first tongue member. The main webbings are mounted respectively through the webbing-locking mechanisms and each main webbing has an end. The at least one retractor is connected with the ends of the two main webbings. The connecting webbing is connected with a bottom of the second connecting tongue.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1, 12, 15, 18, 24, and 25, a multi-point seat belt assembly in accordance with the present invention may be a four-point seat belt assembly 1A, a five-point seat belt assembly 1B, 1C, a six-point seat belt assembly 1D, 1E, or a seven-point seat belt assembly 1F.

Figure 1:
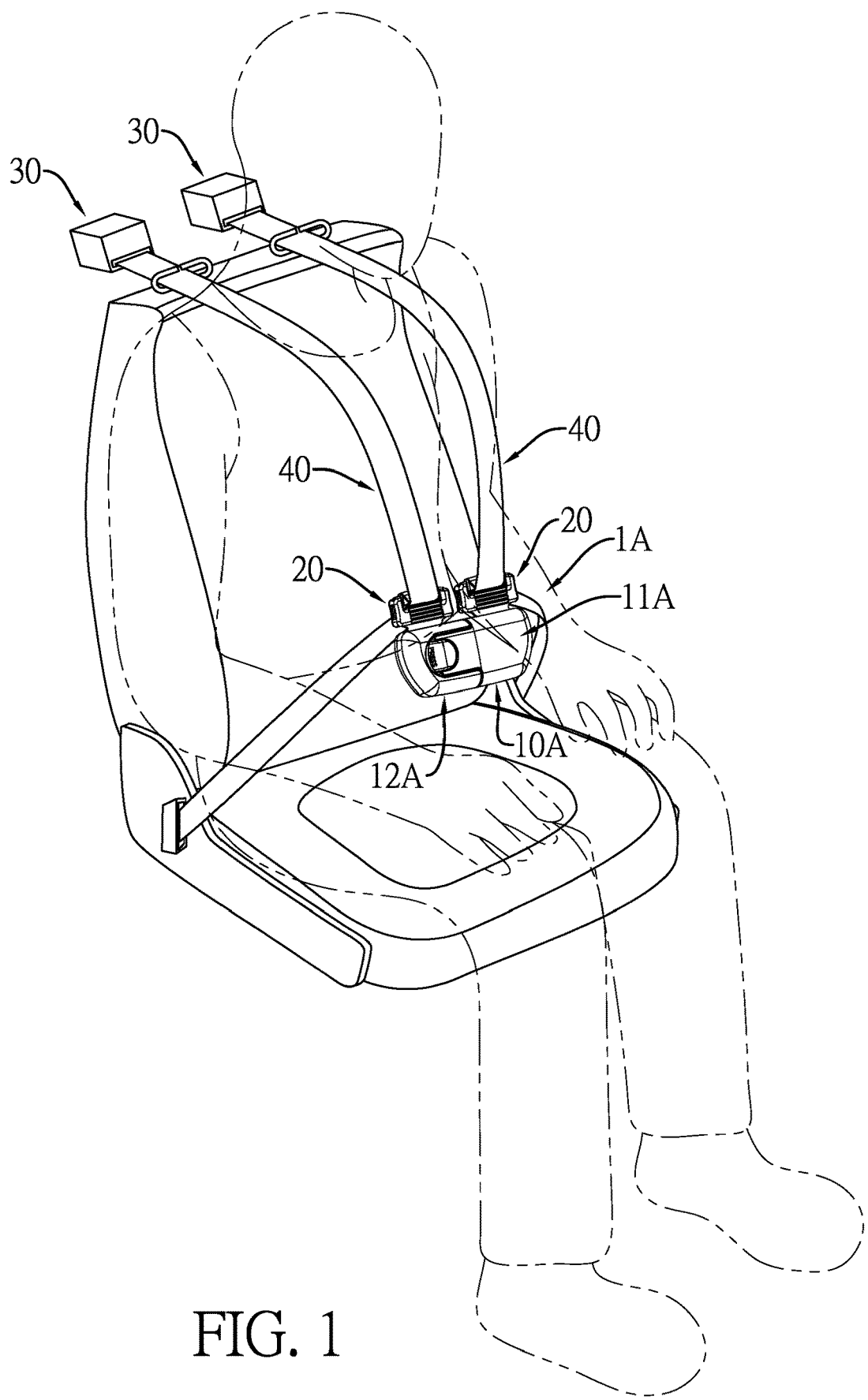
FIG. 1 is an operational perspective view of a first embodiment of a four-point seat belt assembly in accordance with the present invention mounted on a vehicle seat.
Figure 2:
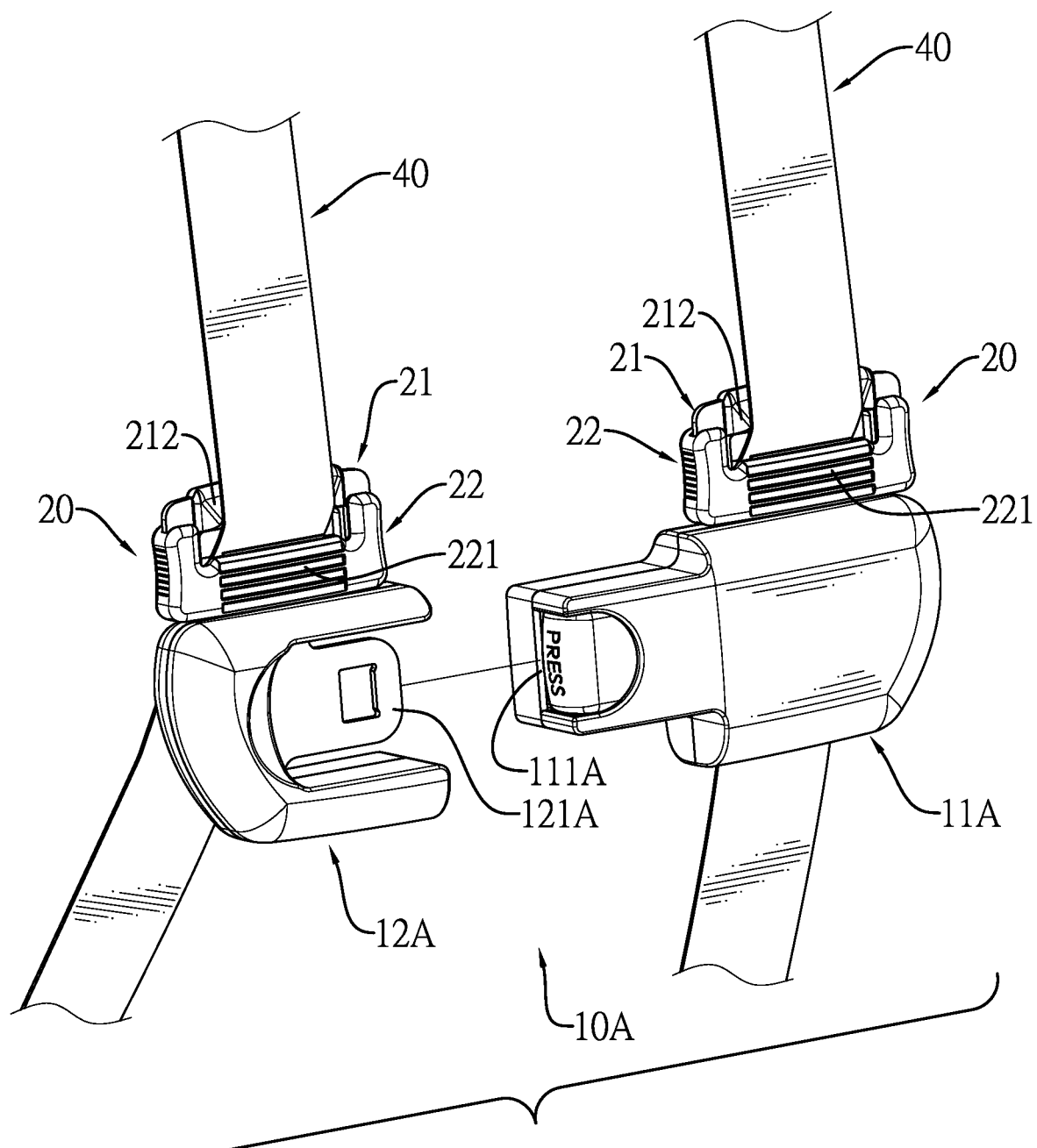
FIG. 2 is an enlarged exploded perspective view of the four-point seat belt assembly in FIG. 1 when the buckle assembly is released.
Figure 3:
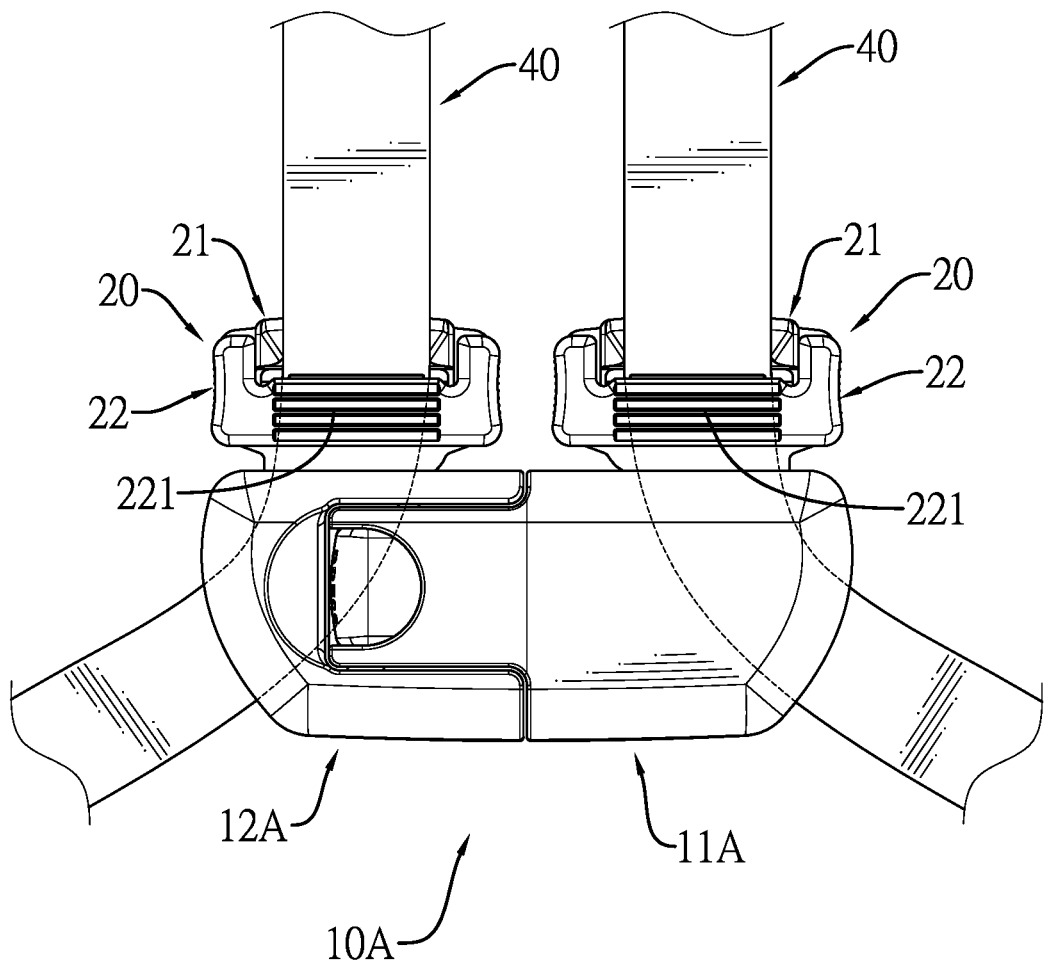
FIG. 3 is an enlarged front view of the four-point seat belt assembly in FIG. 1 when the buckle assembly is fastened.
Figure 4:
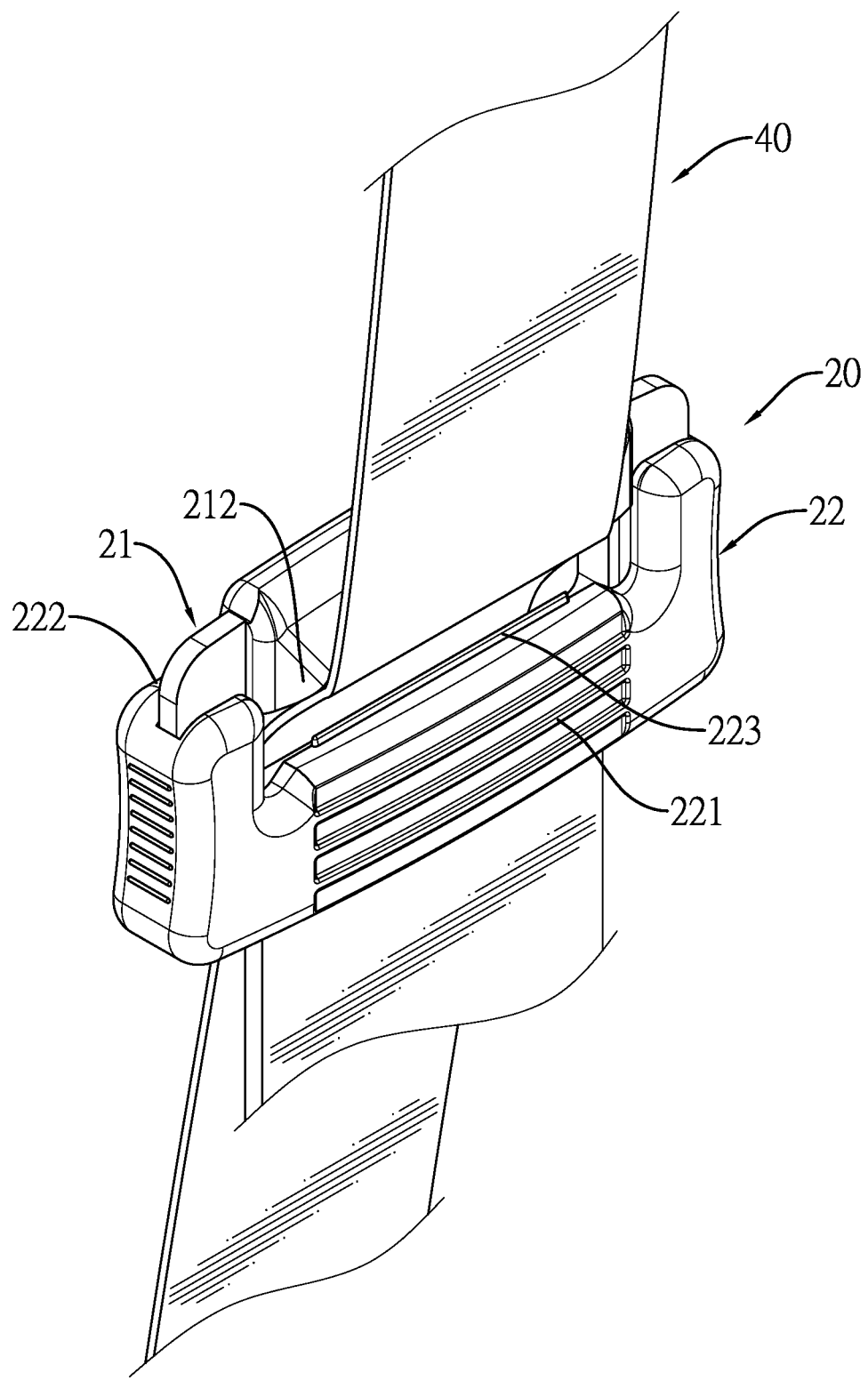
FIG. 4 is an enlarged perspective view that a webbing passes through a webbing-locking mechanism in the four-point seat belt assembly in FIG. 1.
Figure 5:
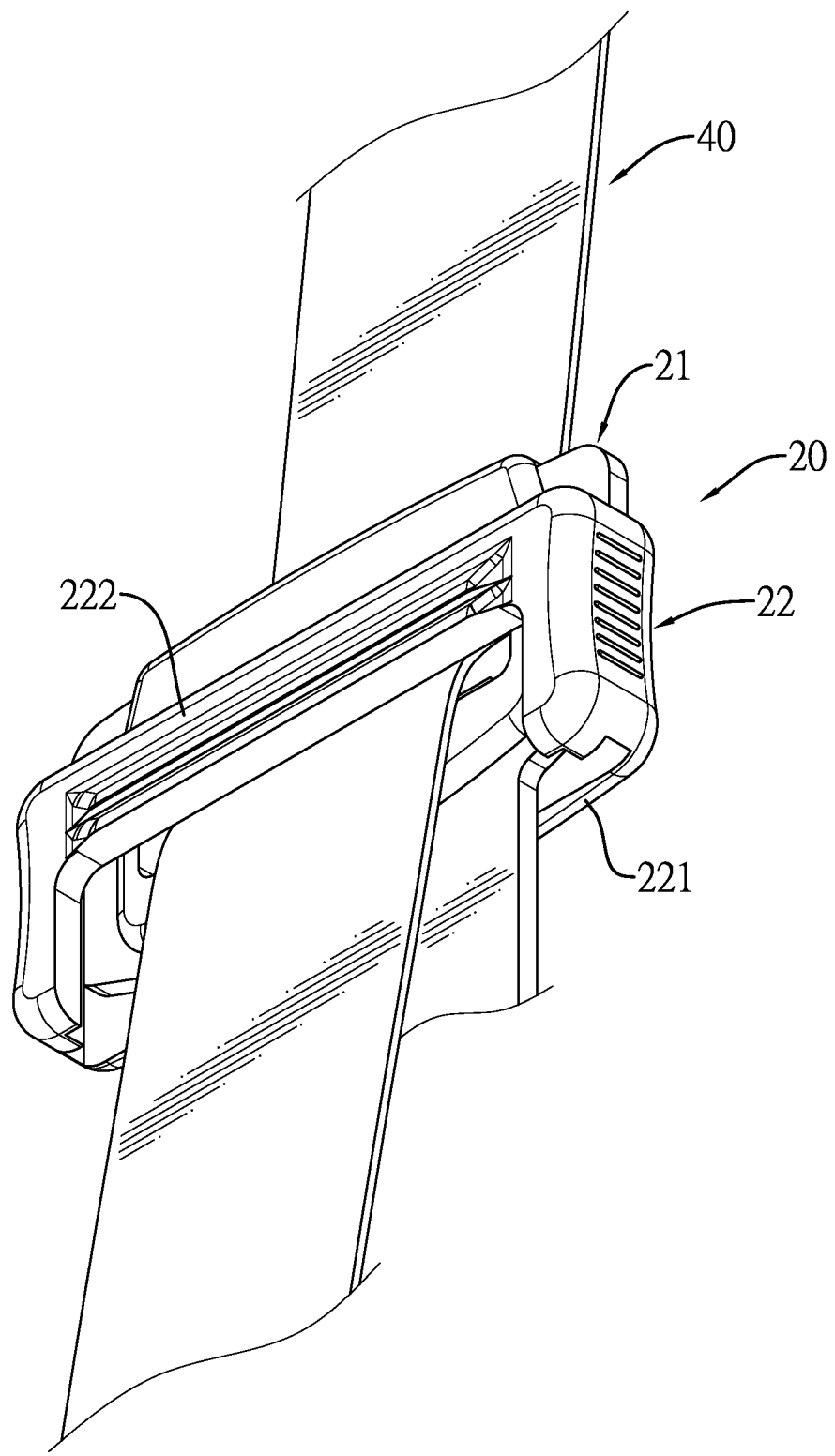
FIG. 5 is another perspective view that the webbing passes through the webbing-locking mechanism in the four-point seat belt assembly in FIG. 4.

With reference to FIG. 1, the four-point seat belt assembly 10A comprises a buckle assembly 10A, two webbing-locking mechanisms 20, two main webbings 40, and at least one retractor 30.

With reference to FIGS. 1 to 4, the buckle assembly 10A comprises a buckle member 11A and a tongue member 12A. The buckle member 11A has a latching mechanism and a pressing member, both of which may be conventional, so the detailed description of the latching mechanism and the pressing member is omitted. The buckle member 11A has a tongue slot 111A defined in the buckle member 11A. The tongue member 12A comprises a connecting segment 121A having a through hole. The connecting segment 121A of the tongue member 12A can be inserted into the tongue slot 111A in the buckle member 11A and is locked by the latching mechanism in the buckle member 11A. When the pressing member is pressed, the tongue member 12A can be released from the buckle member 11A.

With reference to FIGS. 1 to 6, the webbing-locking mechanisms 20 are mounted respectively on the buckle member 11A and the tongue member 12A. Each webbing-locking mechanism 20 comprises a connecting member 21 and a movable member 22. The connecting members 21 of the two webbing-locking mechanisms 20 are connected respectively with the buckle member 11A and the tongue member 12A. The two main webbings 40 extend respectively through the two webbing-locking mechanisms 20. When the relative positions of the connecting member 21 and the movable member 22 of each webbing-locking mechanism 20 are changed, the corresponding main webbing 40 can be locked in a unidirectional manner. The buckle member 11A and the corresponding connecting member 21 may be individual elements and are connected with each other by fasteners. Alternatively, the connecting member 11A and the buckle member 21 are integrally formed with each other to form a single part. The tongue member 12A and the corresponding connecting member 21 may be individual elements and are connected with each other by fasteners. Alternatively, the connecting member 21 and the tongue member 12A are integrally formed with each other to form a single part.

With reference to FIGS. 2 to 6, in the first embodiment of the webbing-locking mechanism 20, the connecting member 21 has a through hole 211 and a first clamping portion 212, and the through hole 211 is defined through the connecting member 21. The first clamping portion 212 is formed on the connecting member 21 at a location above the through hole 211. The shape of the first clamping portion 212 is not limited in the present invention and can be formed by plastic injection.

The movable member 22 comprises a front portion 221 and a rear portion 222. The front portion 221 and the rear portion 222 are located respectively at a front side and a rear side of the connecting member 21 and have a height difference between each other. In the present embodiment, the front portion 221 is located at the front side of the connecting member 21 and is below the first clamping portion 212. The rear portion 222 is located at an upper portion of the rear side of the connecting member 21, such that the front portion 221 and the rear portion 222 have a height difference between each other. A corresponding main webbing 40 passes through the through hole 211 in the connecting member 21 via a space defined between the connecting member 21 and a front end of the front portion 221 of the movable member 22 and passes a bottom of the rear portion 222 of the movable member 22.

Figure 6:
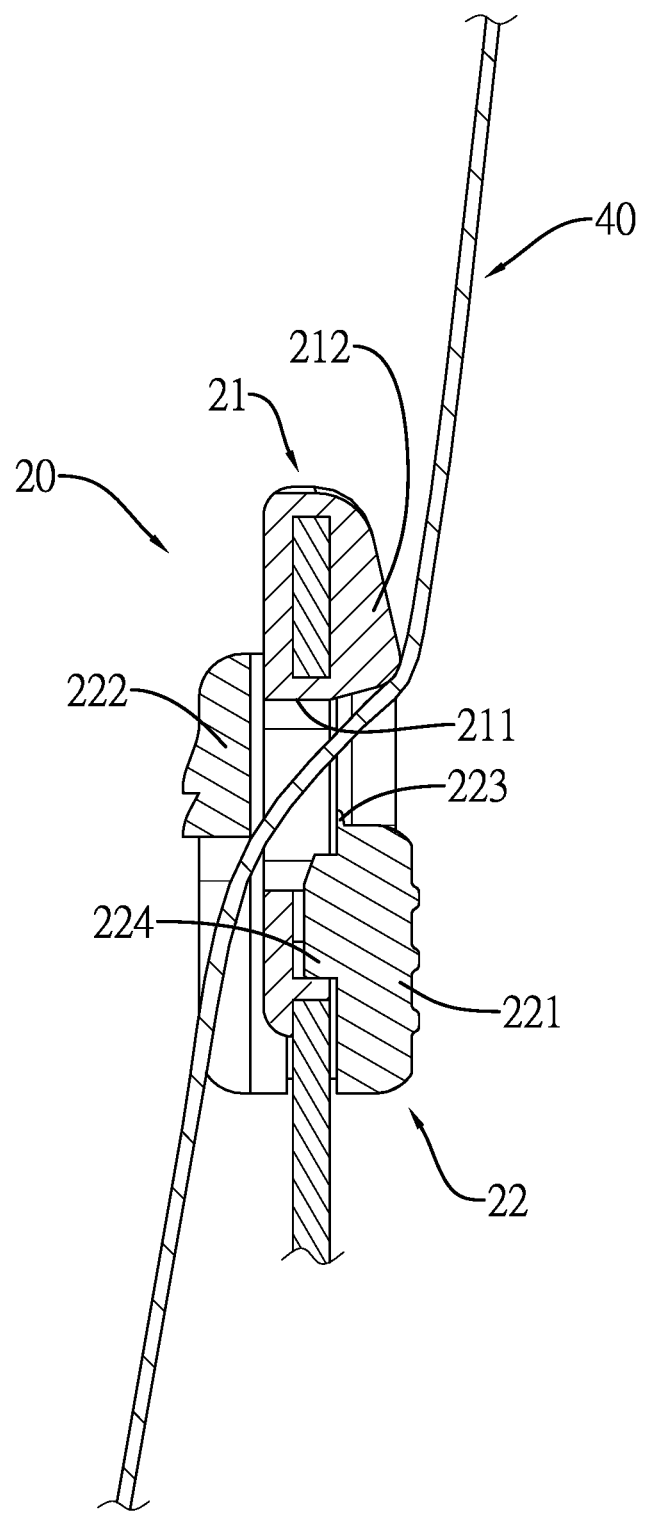
FIG. 6 is a cross sectional side view that the webbing passes throughthe webbing-locking mechanism in the four-point seat belt assembly in FIG. 4.

With reference to FIG. 6, the front portion 221 of the movable member 22 may further have a second clamping portion 223 formed on a top end of the front portion 221. The shape of the second clamping portion 223 is not limited in the present invention. The main webbing 40 passes through a space defined between the clamping portions 212, 223 on the connecting member 21 and the movable member 22. When the relative positions of the connecting member 21 and the movable member 22 are changed, the main webbing 40 is clamped by the first and second clamping portions 212, 223.

In addition, the movable member 22 may further have a limiting protrusion 224 formed on and protruding from the front portion 22 and extending slidably in the through hole 211 in the connecting member 21. With the limiting protrusion 224 extending into the through hole 211, the movable member 22 can be kept from falling from the connecting member 21 and the movement range of the movable member 22 can be limited.

Figure 8:
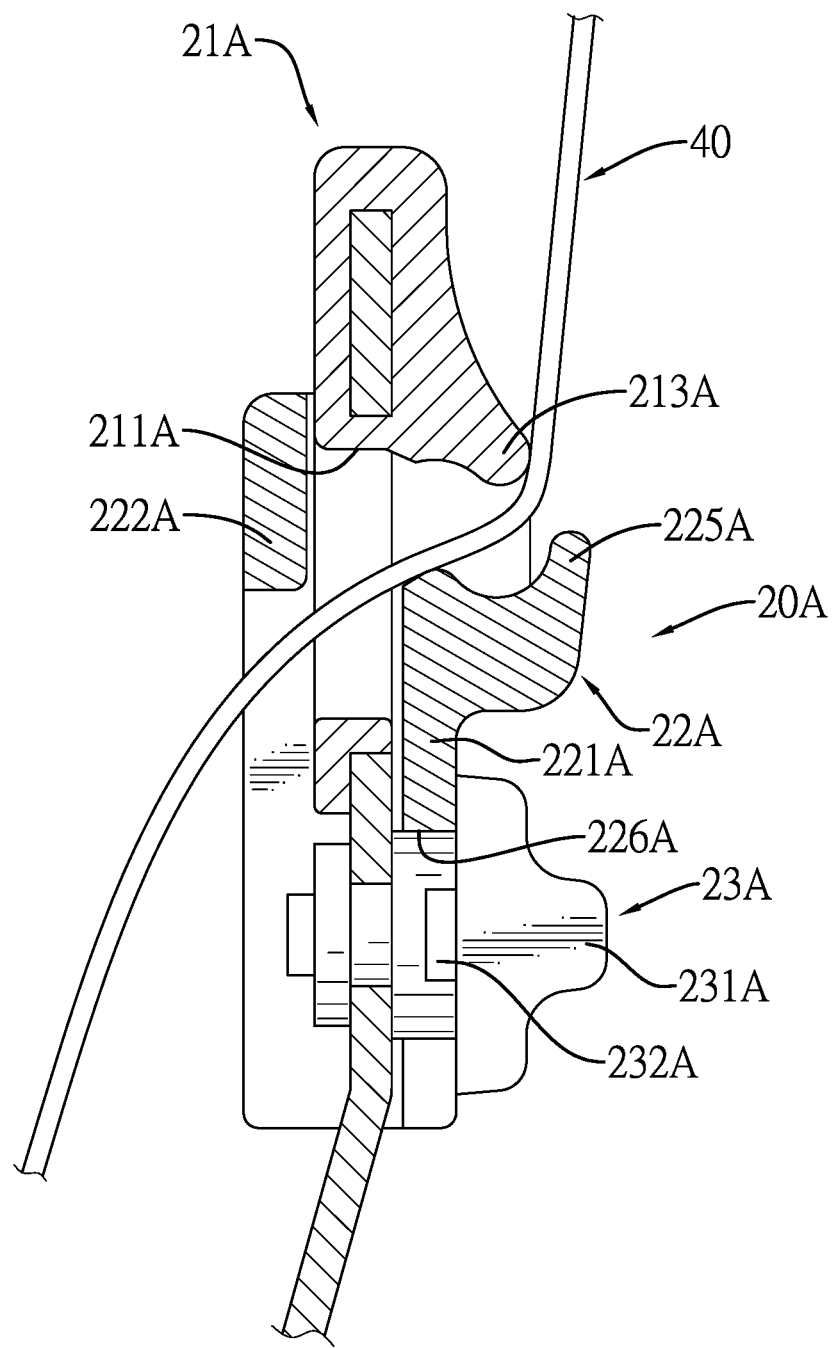
FIG. 8 is a cross sectional side view that a webbing passes through a second embodiment of a webbing-locking mechanism in a multi-point seat belt assembly in accordance with the present invention.

With reference to FIG. 8, in the second embodiment of the webbing-locking mechanism 20A, the webbing-locking mechanism 20A comprises a connecting member 21A and a movable member 22A mounted moveably on the connecting member 21A. The relative positions of the movable member 22A and the connecting member 21A can be changed. The connecting member 21A has a through hole 211A defined through the connecting member 21A. A first clamping portion 213A is formed on the connecting member 21A at a location above the through hole 211A. The first clamping portion 213A may be formed by plastic injection.

Figure 9:
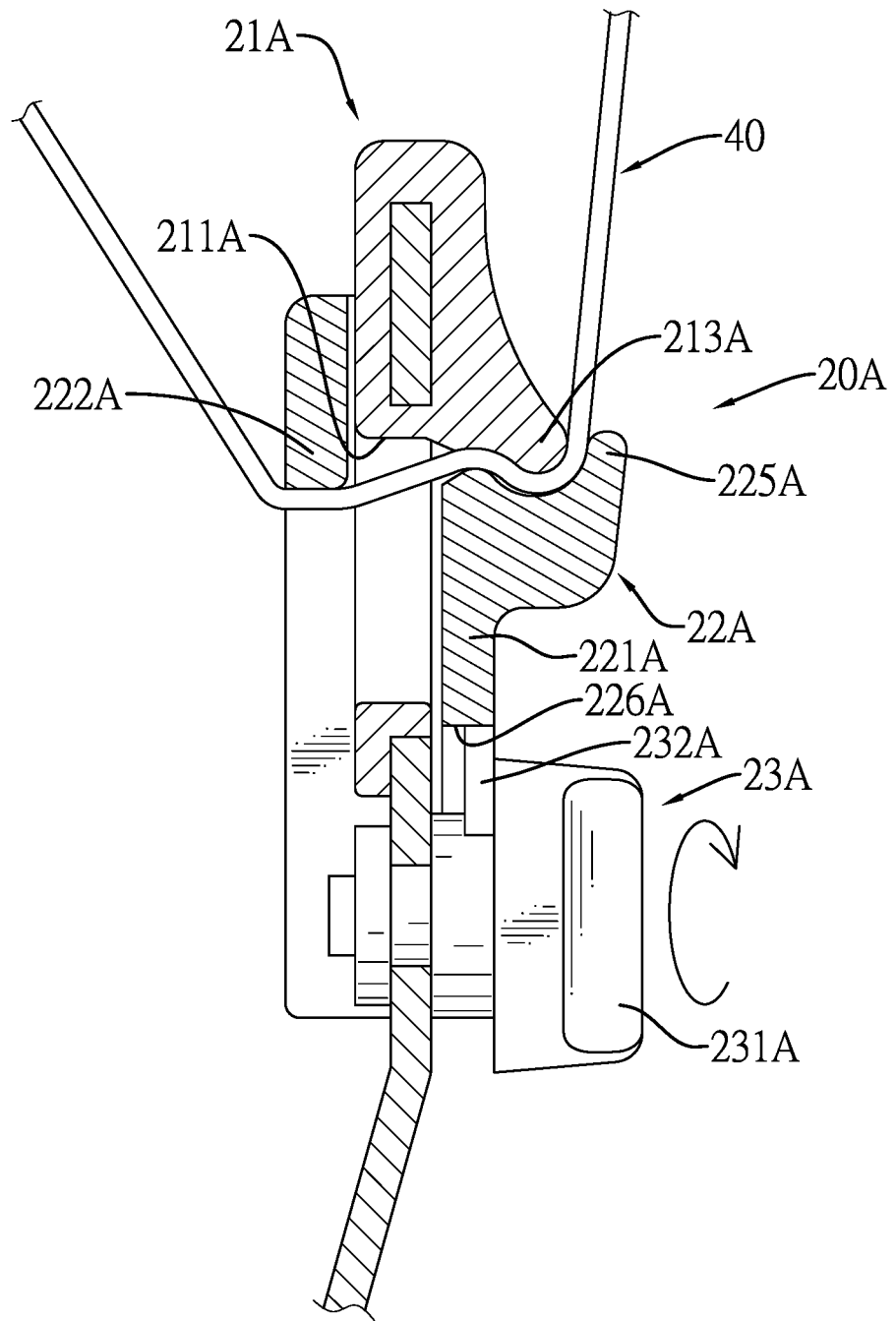
FIG. 9 is an operational cross sectional side view that the change of the relative positions of the moveable member and the connecting member due to the tension of the main webbing in FIG. 8.

The movable member 22A comprises a front portion 221A and a rear portion 222A. The front portion 221A and the rear portion 222A are located respectively at a front side and a rear side of the connecting member 21A and have a height difference between each other. With reference to FIGS. 8 and 9, the front portion 221A has a second clamping portion 225A formed on the front portion 221A. When the relative positions of the movable member 22A and the connecting member 21A are changed, the second clamping portion 225A can clamp a corresponding main webbing 40 in cooperation with the first clamping portion 213A on the connecting member 21A.

With reference to FIGS. 8 and 9, the movable member 22A further has a longitudinal recess 226A defined in a bottom end of the movable member 22A. The connecting member 21A further has a locking member 23A mounted pivotally on the connecting member 21A and extending through the longitudinal recess 226A in the movable member 22A. The locking member 23A comprises a rotating knob 231A and a pushing portion 232A formed on the rotating knob 231A and mounted in the longitudinal recess 226A. When the rotating knob 231A is rotated to a longitudinal position, the pushing portion 232A will push the movable member 22A to move upward to enable the second clamping portion 225A to clamp the corresponding main webbing 40 in cooperation with the first clamping portion 213A. Accordingly, the main webbing 40 is in a locked condition. Consequently, when the connecting tongue 12A is inserted into the buckle member 11A, the main webbing 40 can be locked by change of the relative positions of movable member 22A and the connecting member 21A due to the tension of the main webbing 40 or by rotating the rotating knob 231A.

Figure 10:
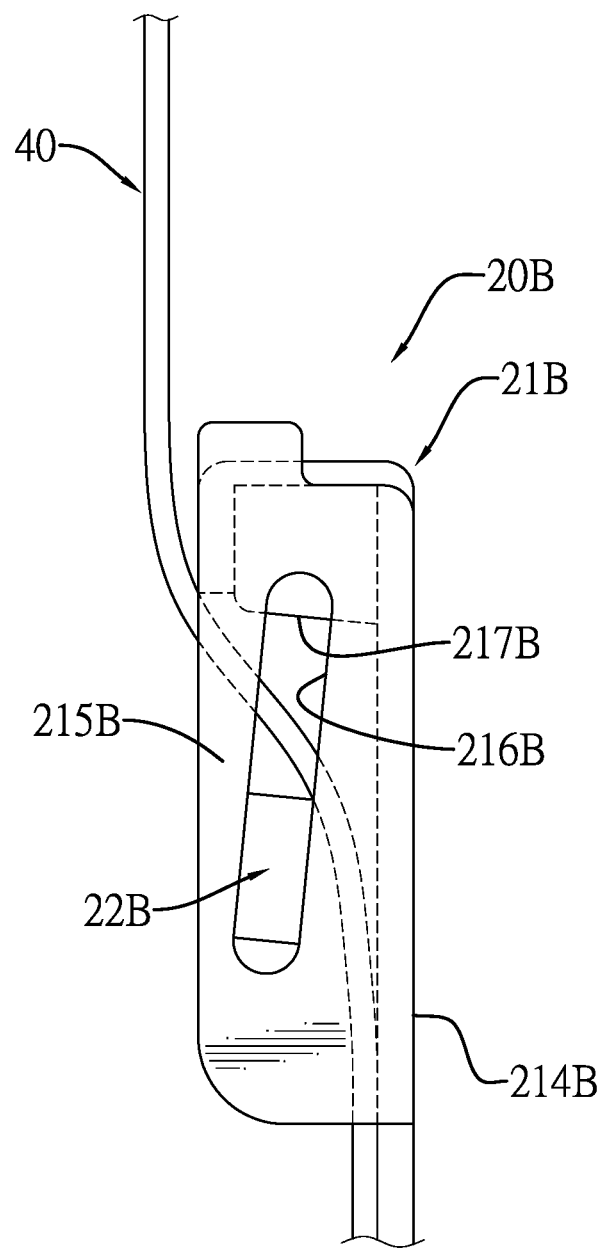
FIG. 10 is a cross sectional side view that a webbing passes through a third embodiment of a webbing-locking mechanism in a multi-point seat belt assembly in accordance with the present invention.
Figure 11:
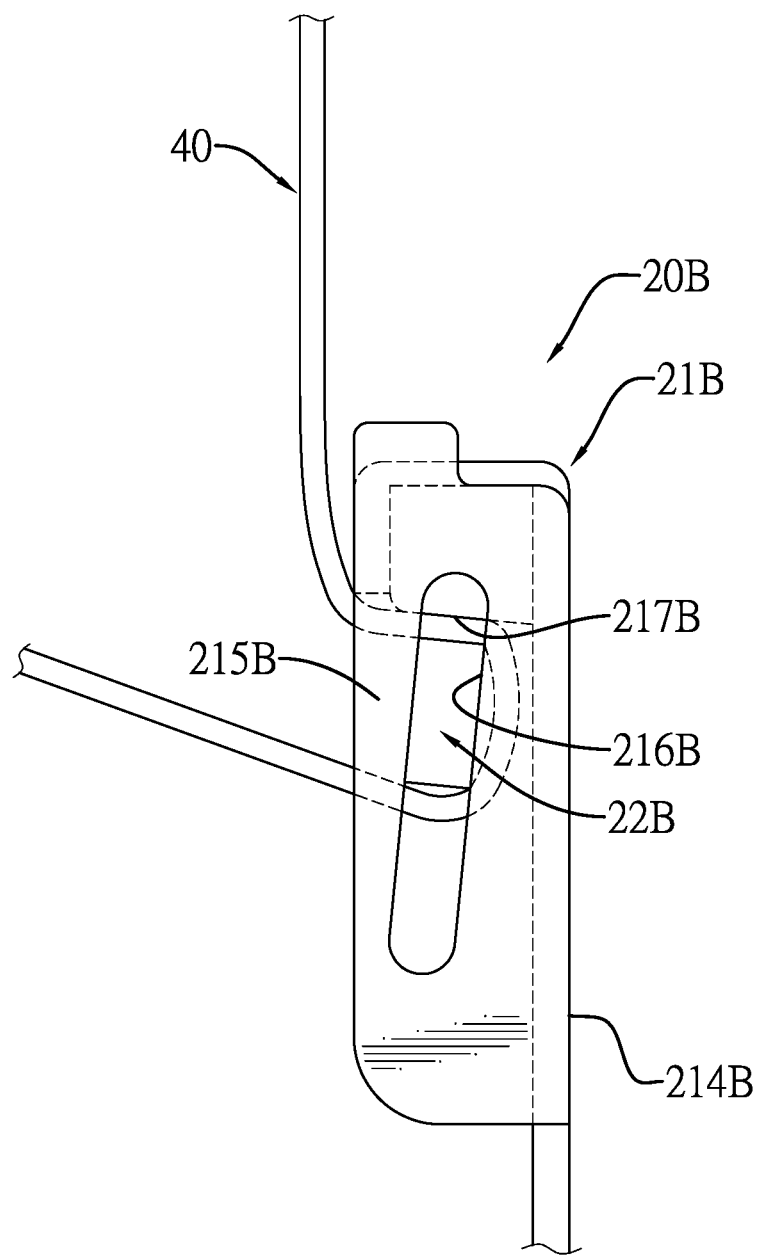
FIG. 11 is an operational cross sectional side view that the change of relative positions of the movable member and the connecting member due to the tension of the main webbing in FIG. 10.

With reference to FIGS. 10 and 11, in the third embodiment of the webbing-locking mechanism 20B, the webbing-locking mechanism 20B comprises a connecting member 21B and a movable member 22B mounted moveably on the connecting member 21B. The connecting member 21B comprises a body 214B and two sidewalls 215B formed respectively on two sides of the body 214B. Each sidewall 215B has an inclined slot 216B defined through the sidewall 215B. The inclined slot 216B extends from a top front side to a bottom rear side. The movable member 22B is mounted moveably between the sidewalls 215B of the connecting member 21B and has two ends extending slidably respectively into the inclined slots 216B of the sidewalls 215B of the connecting member 21B. The body 214B of the connecting member 21B has a clamping portion 217B formed on a top of the body 214B at a position between the sidewalls 215B of the connecting member 21B. The clamping portion 217B may be toothed or have a rough surface. A corresponding main webbing 40 passes through a space defined between the clamping portion 217B of the body 214B of the connecting member 21B and a top of the movable member 22B and passes a bottom of the movable member 22B.

The at least one retractor 30 can be implemented as one or two in amount and is mounted on a backrest of a vehicle seat. When one retractor 30 is implemented, the retractor 30 is mounted on a bottom end of the backrest of the vehicle seat and the two main webbings 40 are connected with the retractor in a Y-shaped manner. With reference to FIG. 1, when two retractors 30 are implemented, the two retractors 30 are mounted respectively on two sides of a top of the backrest and the two main webbings 40 are connected respectively with the two retractors 30. The retractors 30 can retract the main webbings 40 into the retractors 30 and have locking mechanisms to lock the main webbings 40 when the vehicle is inclined. The retractors 30 may be conventional, so the detailed description of the retractors 30 is omitted.

Figure 7:
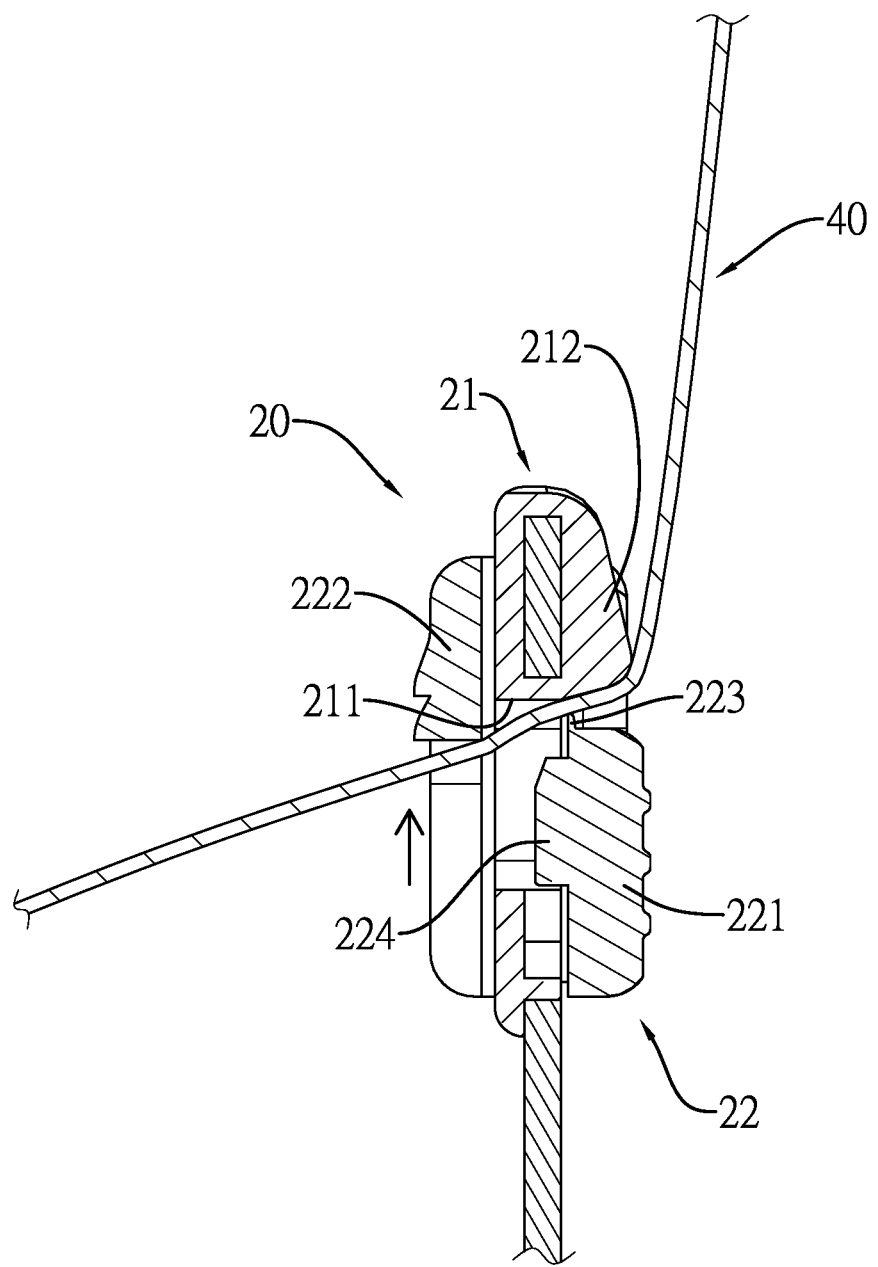
FIG. 7 is an operational cross sectional side view that the change of the relative positions of the movable member and the connecting member due to the tension of the main webbing in FIG. 6.

With reference to FIG. 1, the main webbings 40 are mounted respectively through the webbing-locking mechanisms 20, and one end of each main webbing 40 is connected with one of the retractors 30. The other end of each main webbing 40 is a fixed end securely connected with a side of the vehicle seat. With reference to FIG. 7, the tension of the main webbing 40 can change the position of the movable member 22 relative to the connecting member 21, such that the main webbing 40 can be locked in a unidirectional manner by the corresponding webbing-locking mechanism 20.

With reference to FIG. 1, in the first embodiment, two ends of each main webbing 40 are connected respectively with one of the retractors 30 and a side of the backrest of the vehicle seat. Consequently, a four-point seat belt assembly 1A is provided.

When the four-point seat belt assembly 1A is buckled and the locking mechanisms in the retractors 30 are locked due to emergency brake or initiation of tilt-lock mechanism, the webbing-locking mechanisms 20 will provide a unidirectional locking effect to the main webbings 40 due to the change of the tension of the main webbings 40. At this time, the position of the movable member 22 relative to the connecting member 21 is changed, and the corresponding main webbing 40 is clamped by the clamping portions 212, 223 of the connecting member 21 and the movable member 22. Thus, the main webbings 40 are kept from sliding relative to the webbing-locking mechanisms 20, and the body of a driver or a passenger can be securely held on the vehicle seat by the main webbings 40 to protect the driver or the passenger.

Figure 12:
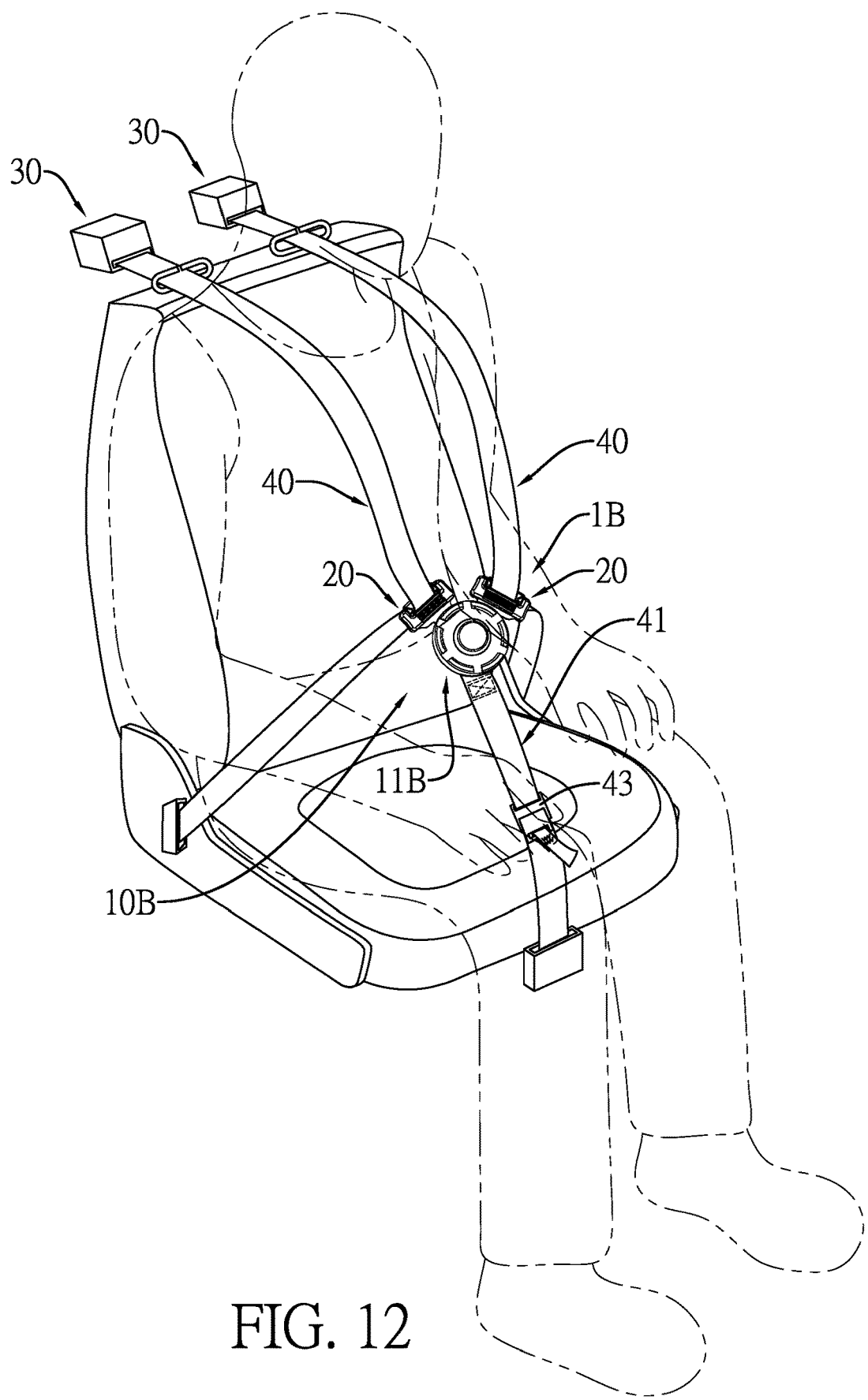
FIG. 12 is an operational perspective view of a first embodiment of a five-point seat belt assembly in accordance with the present invention mounted on a vehicle seat.
Figure 14:
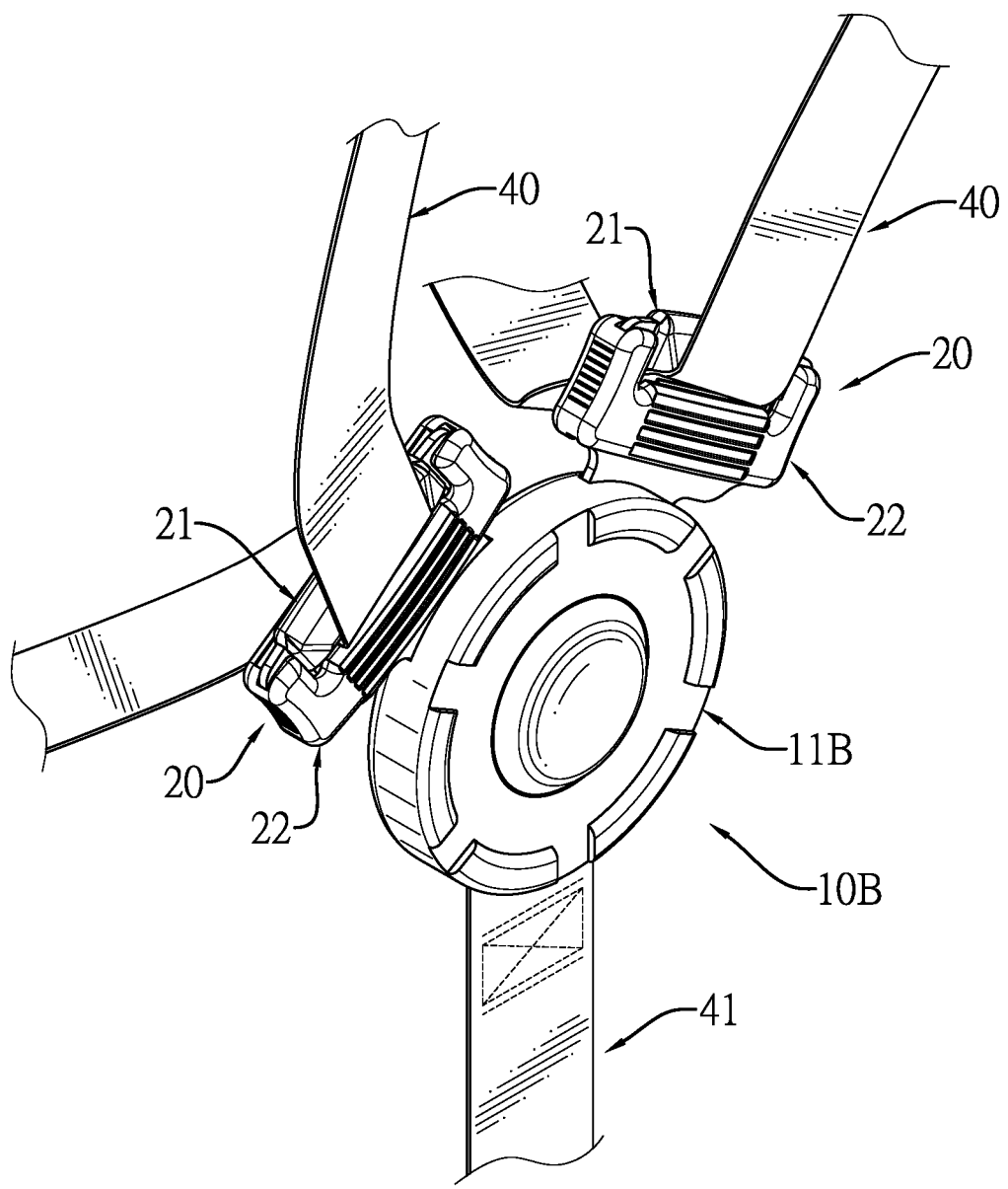
FIG. 14 is an enlarged perspective view of the first embodiment of the five-point seat belt assembly in FIG. 12 when the buckle assembly is fastened.

With reference to FIGS. 12 and 14, a five-point seat belt assembly 1B is shown and comprises a buckle assembly 10B, two webbing-locking mechanisms 20, two main webbings 40, at least one retractor 30, and a connecting webbing 41.

The buckle assembly 10B comprises a buckle member 11B and two tongue members 12B. The buckle member 11B has a latching mechanism that may be conventional. The buckle member 11B further has two tongue slots 111B defined in a side of the buckle member 11B. Each tongue member 12B has a connecting segment 121B having a through hole. The connecting segments 121B of the tongue members 12B can be inserted into the tongue slots 111B in the buckle member 11B and are locked by the latching mechanism in the buckle member 11B.

The two webbing-locking mechanisms 20 are connected respectively with the tongue members 12B. Each tongue member 12B and the corresponding connecting member 21 may be individual elements and are connected with each other by fasteners. Alternatively, the connecting member 21 and the tongue member 12B are integrally formed with each other to form a single part.

The webbing-locking mechanisms 20, the retractors 30, and the main webbings 40 of the five-point seat belt assembly 1B may be same as those in the four-point set belt assembly 1A. The at least one retractor 30 may be implemented as one or two in amount. Each webbing-locking mechanism 20 may be the one shown in FIGS. 8 to 11, so the detailed description thereof is omitted.

Figure 13:
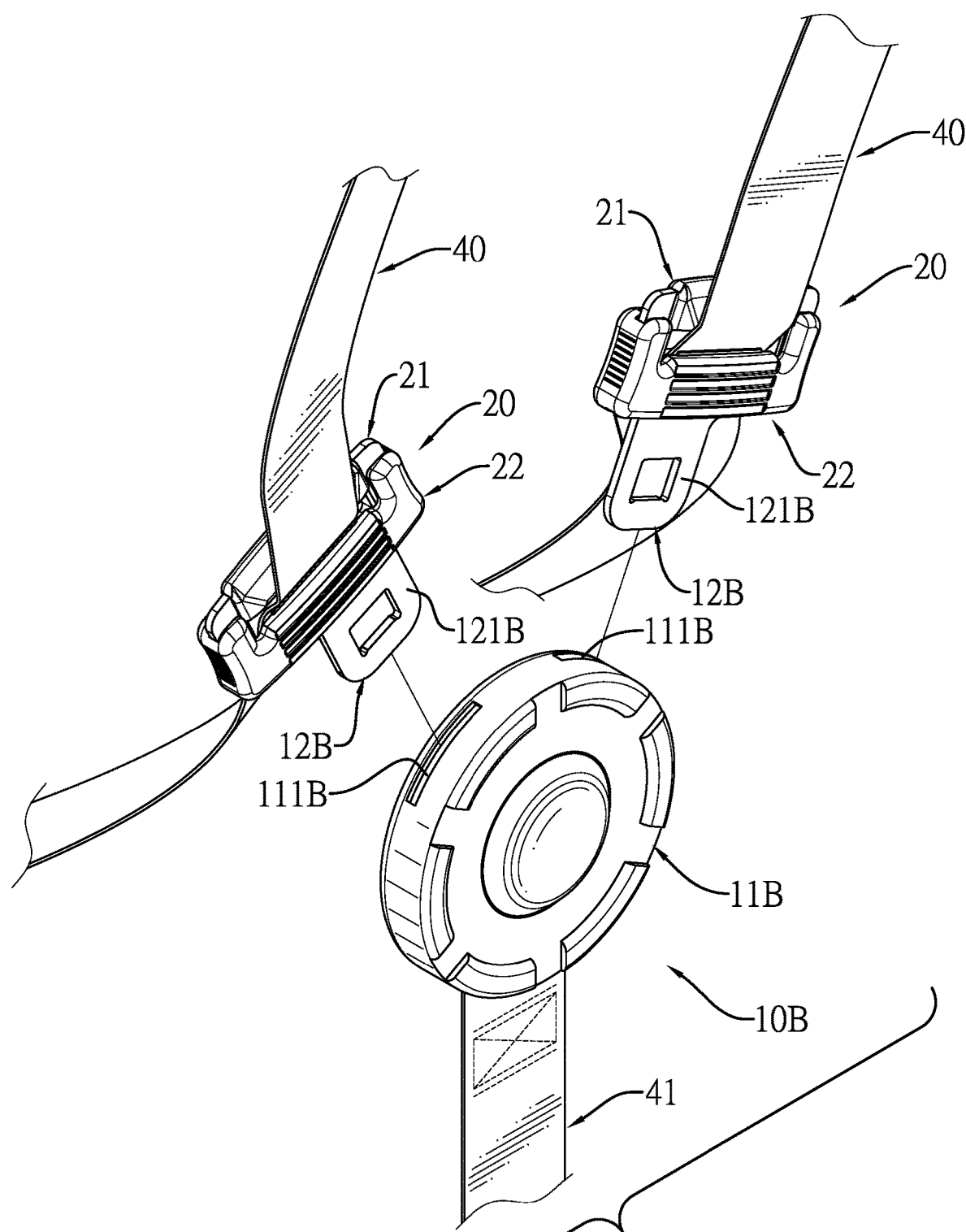
FIG. 13 is an enlarged exploded perspective view of the first embodiment of the five-point seat belt assembly in FIG. 12 when the buckle assembly is released.

With reference to FIGS. 12 to 14, one end of the connecting webbing 41 is connected with a bottom of the buckle member 11B, and the connecting webbing 41 may further have an adjusting member 43 mounted on the connecting webbing 41 to adjust the length of the connecting webbing 41. The adjusting member 43 may be conventional, so the detailed description thereof is omitted.

In the first embodiment of the five-point seat belt assembly 1B shown in FIGS. 12 to 14, one end of each main webbing 40 is connected with one of the retractors 30 that is mounted on a side of a top of a backrest of the vehicle seat, the other end of each main webbing 40 is connected securely with a side of a seat. The connecting webbing 41 has a bottom end connected with a front bottom end of the vehicle seat and located between two legs of a user. Accordingly, a five-point seat belt assembly 1B is provided.

When the five-point seat belt assembly 1B is buckled and the locking mechanisms in the retractors are locked due to emergency brake or initiation of tilt-lock mechanism, the webbing-locking mechanisms 20 will provide a unidirectional locking effect to the main webbings 40 due to the change of the tension of the main webbings 40. Accordingly, the body of a driver or a passenger can be securely held on the vehicle seat by the main webbings to protect the driver or the passenger.

Figure 15:
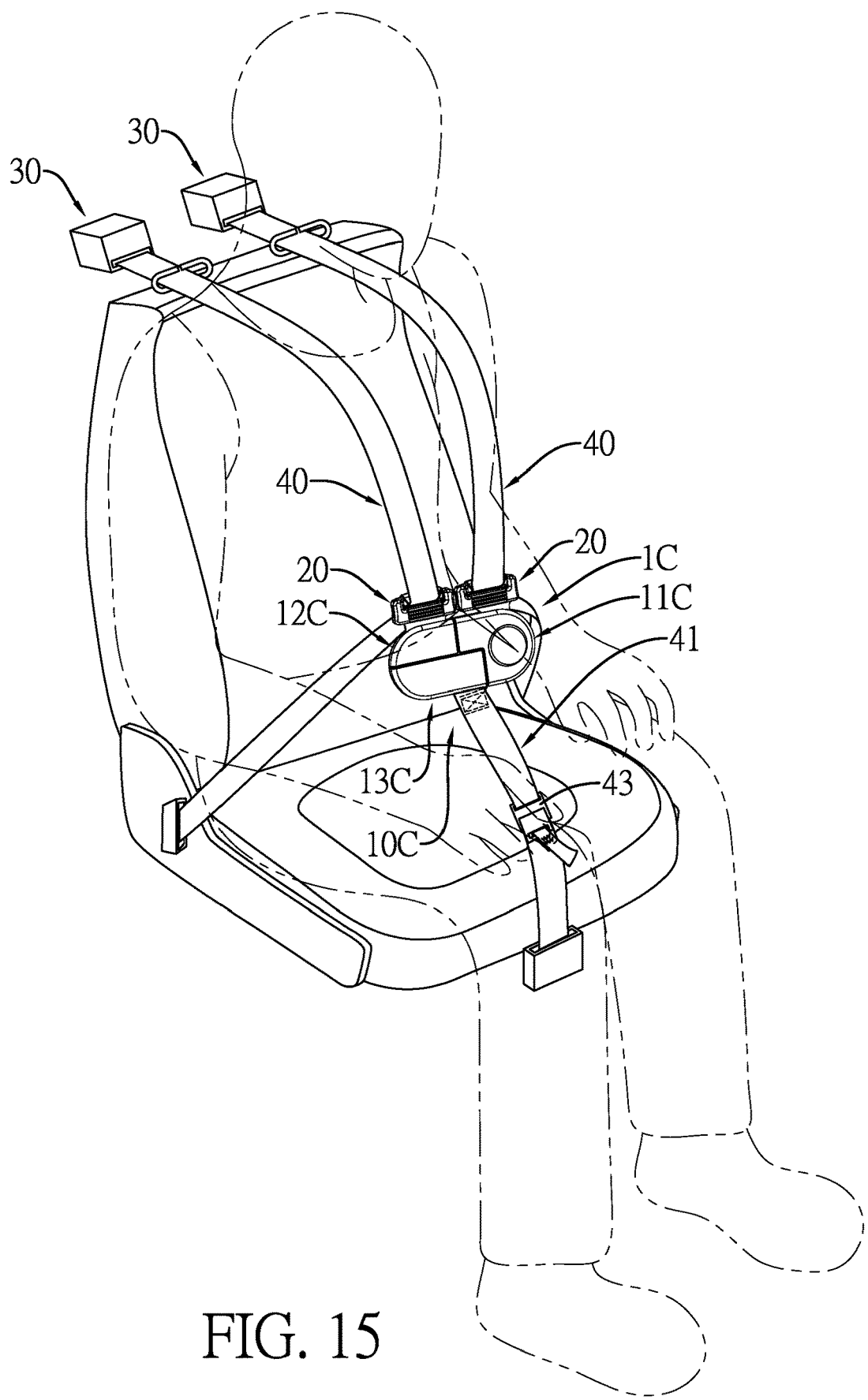
FIG. 15 is an operational perspective view of a second embodiment of a five-point seat belt assembly in accordance with the present invention mounted on a vehicle seat.
Figure 16:
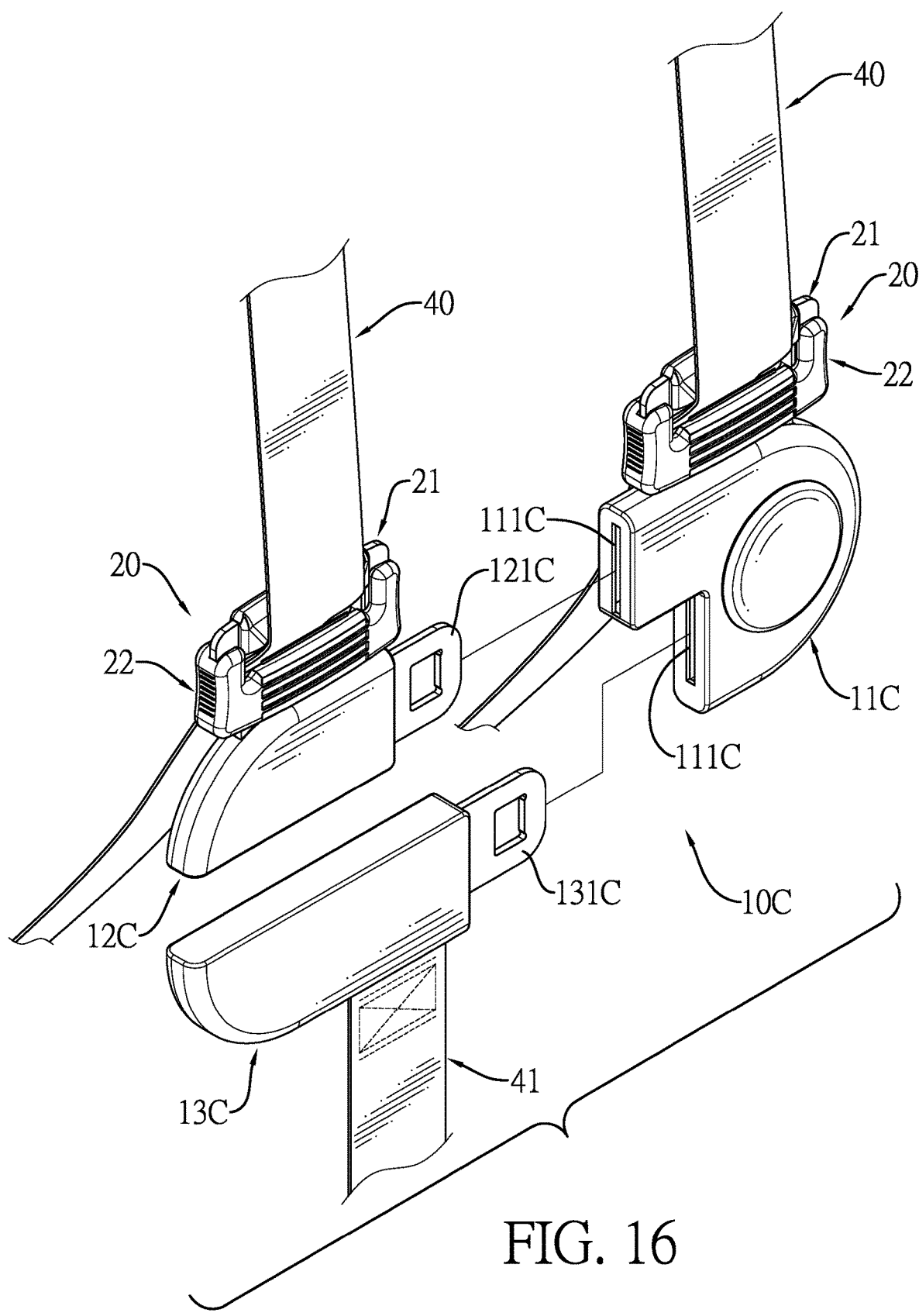
FIG. 16 is an enlarged exploded perspective view of the second embodiment of the five-point seat belt assembly in FIG. 15.
Figure 17:
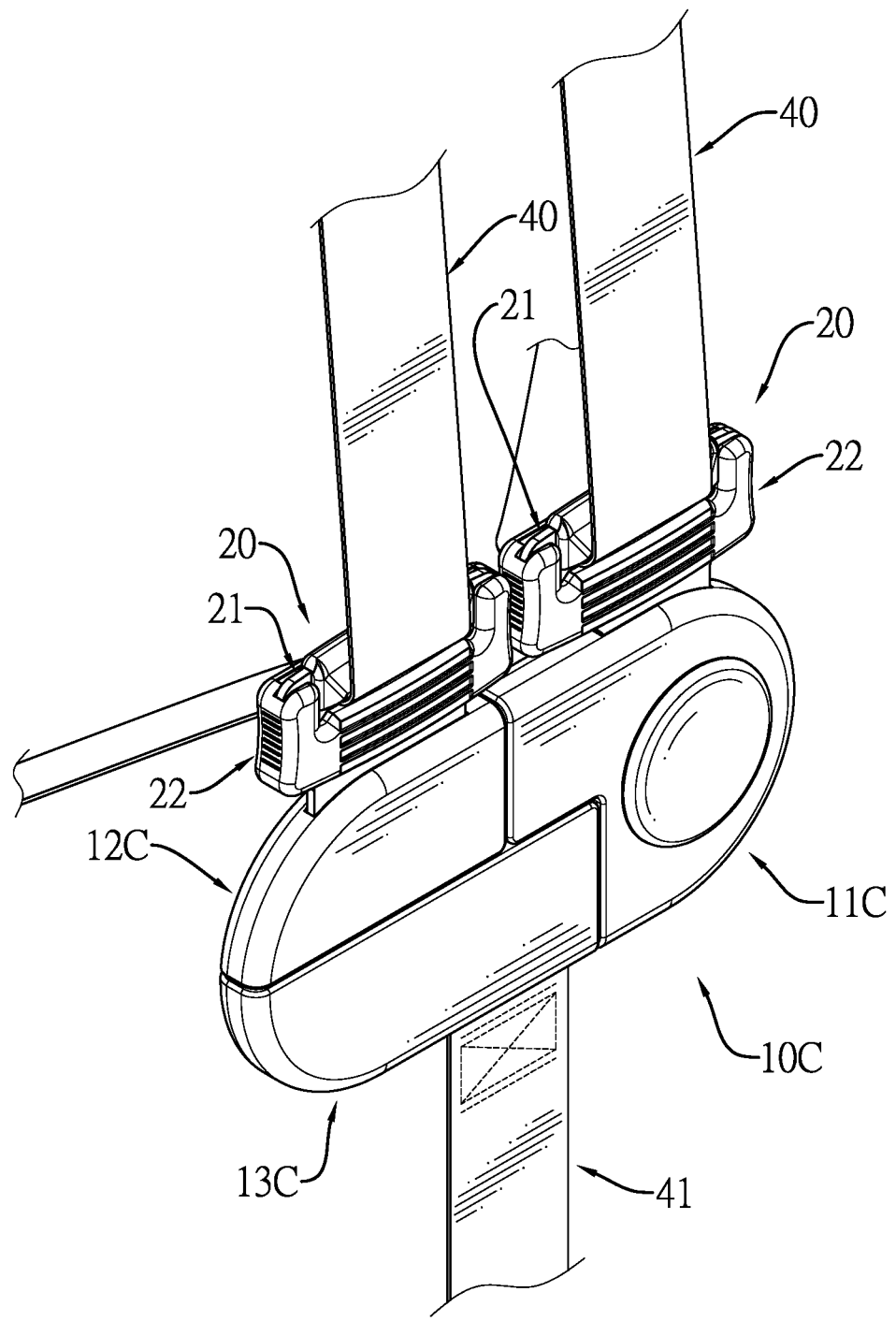
FIG. 17 is an enlarged perspective view of the second embodiment of the five-point seat belt assembly in FIG. 15 when the buckle assembly is fastened.

With reference to FIGS. 15 to 17, in the second embodiment, the five-point seat belt assembly 1C comprises a buckle assembly 10C, two webbing-locking mechanisms 20, at least one retractor 30, two main webbings 40, and a connecting webbing 41.

The buckle assembly 10C comprises a buckle member 11C and two tongue members 12C, 13C. The buckle member 11C has a latching mechanism that may be conventional. The buckle member 11C further has two tongue slots 111C defined in a side of the buckle member 11C. The two tongue members 12C, 13C are defined respectively as a first tongue member 12C and a second tongue member 13C. Each tongue member 12C, 13C has a connecting segment 121C, 131C having a through hole. The connecting segments 121C, 131C of the tongue members 12C, 13C can be inserted into the tongue slots 111C in the buckle member 11C and are locked by the latching mechanism in the buckle member 11C. The webbing-locking mechanisms 20 are connected respectively with the buckle member 11C and the first tongue member 12C. The buckle member 11C and the corresponding connecting member 21 may be individual elements and are connected with each other by fasteners. Alternatively, the connecting member 21 and the buckle member 11C are integrally formed with each other to form a single part. The first tongue member 12C and the corresponding connecting member 21 may be individual elements and are connected with each other by fasteners. Alternatively, the connecting member 21 and the first tongue member 12C are integrally formed with each other to form a single part.

The webbing-locking mechanisms 20, the at least one retractor 30, and the main webbings 40 in the five-point seat belt assembly 1B may be same as those in the four-point seat belt assembly 1A. The at least one retractor 30 may be implemented as one or two in amount. Each webbing-locking mechanism 20 may be the one shown in FIGS. 8 to 11, so the detailed description thereof is omitted.

With reference to FIGS. 15 to 17, one end of the connecting webbing 41 is connected with the second tongue member 13C, and the connecting webbing 41 may further have an adjusting member 43 mounted on the connecting webbing 41 to adjust the length of the connecting webbing 41. The adjusting member 43 may be conventional, so the detailed description thereof is omitted.

In the five-point seat belt assembly 1C shown in FIGS. 15 to 17, one end of each main webbing 40 is connected with one of the retractors 30 that is mounted on a side of a top of a backrest of the vehicle seat, and the other end of each main webbing 40 is connected securely with a side of a seat. The connecting webbing 41 has a bottom end connected with a front bottom end of the vehicle seat. Accordingly, a five-point seat belt assembly 1C is provided.

When the five-point seat belt assembly 1C is buckled and the locking mechanisms in the retractors 30 are locked due to emergency brake or initiation of tilt-lock mechanism, the webbing-locking mechanisms 20 will provide a unidirectional locking effect to the main webbings 40 due to the change of the tension of the main webbings 40. Accordingly, the body of a driver or a passenger can be securely held on the vehicle seat by the main webbings to protect the driver or the passenger.

With reference to FIGS. 18 to 21, the first embodiment of a six-point seat belt assembly 1D is shown and comprises a buckle assembly 10D, two webbing-locking mechanisms 20, at least one retractor 30, two main webbings 40, and two auxiliary webbings 42.

The buckle assembly 10D, the webbing-locking mechanisms 20, the at least one retractor 30, and the main webbings 40 in the first embodiment of the six-point seat belt assembly may be same as those in the four-point seat belt assembly 1A. The at least one retractor 30 may be implemented as one or two in amount. Each webbing-locking mechanism 20 may be the one shown in FIGS. 8 to 11, so the detailed description thereof is omitted. The two auxiliary webbings 42 are connected respectively with the buckle member 11D and the tongue member 12D. Each auxiliary webbing 42 has an adjusting member 43 mounted on the auxiliary webbing 42. With such a six-point seat belt assembly 1D, an enhanced safety effect can be provided.

In the six-point seat belt assembly 1D shown in FIGS. 18 to 21, one end of each main webbing 40 is connected with one of the retractors 30 that is mounted on a side of a top of a backrest of the vehicle seat, and the other end of each main webbing 40 is connected securely with a side of a seat. The bottom ends of the two auxiliary webbings 42 are connected respectively with two sides of a front end of the vehicle seat. Accordingly, a six-point seat belt assembly 1D is provided.

Figure 18:
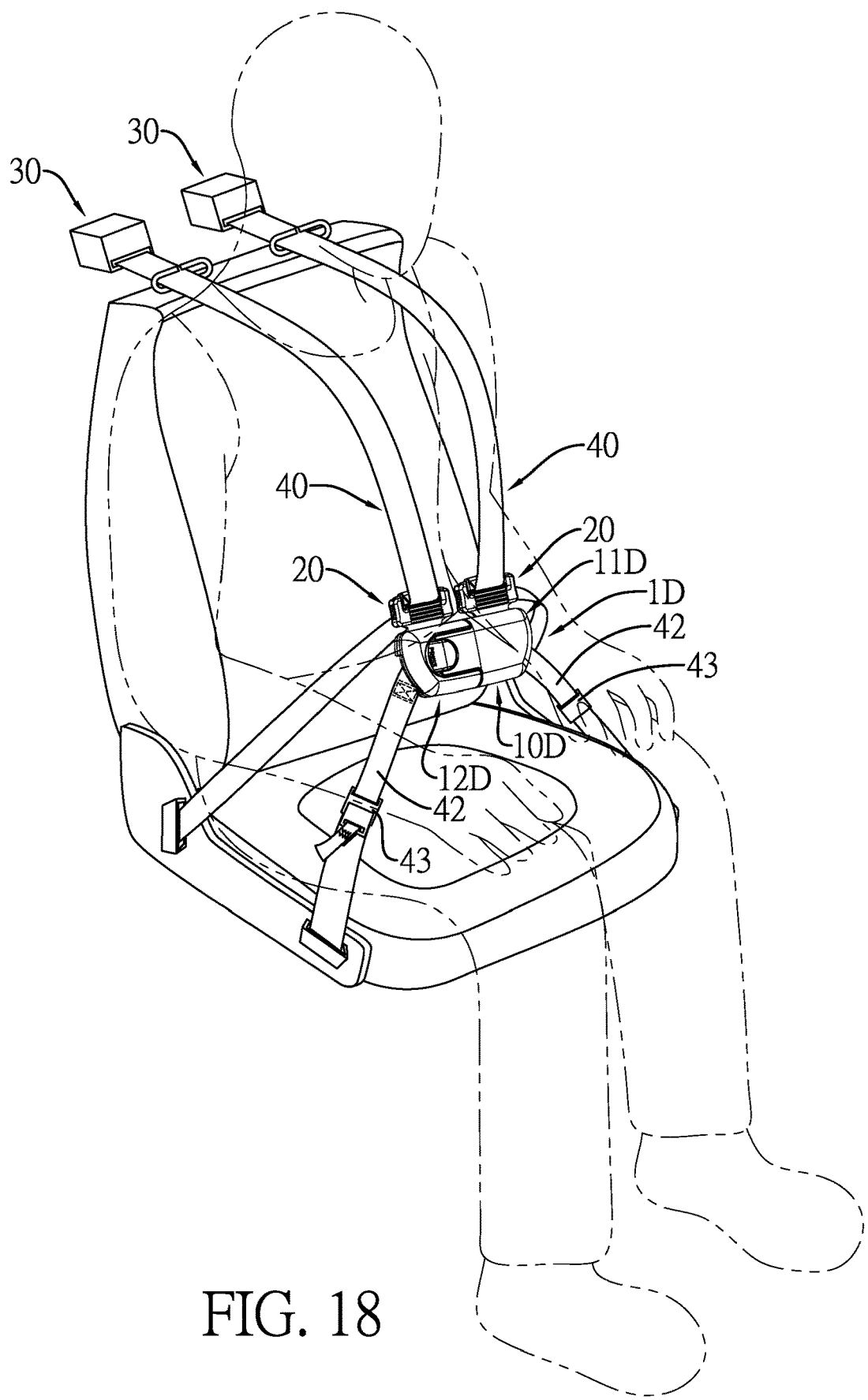
FIG. 18 is an operational perspective view of a first embodiment of a six-point seat belt assembly in accordance with the present invention mounted on a vehicle seat.
Figure 19:
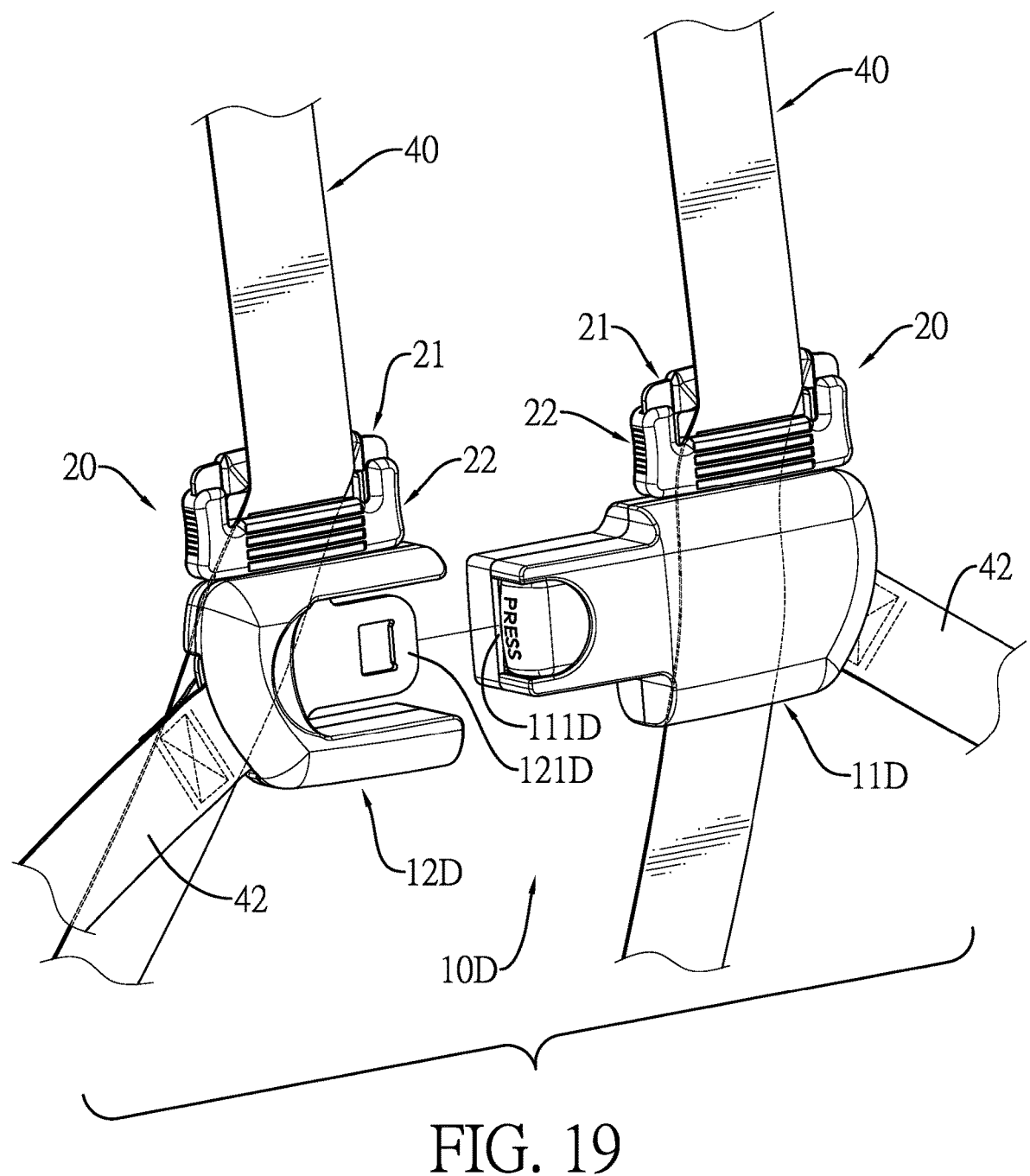
FIG. 19 is an enlarged exploded perspective view of the first embodiment of the six-point seat belt assembly in FIG. 18 when the buckle assembly is released.
Figure 20:
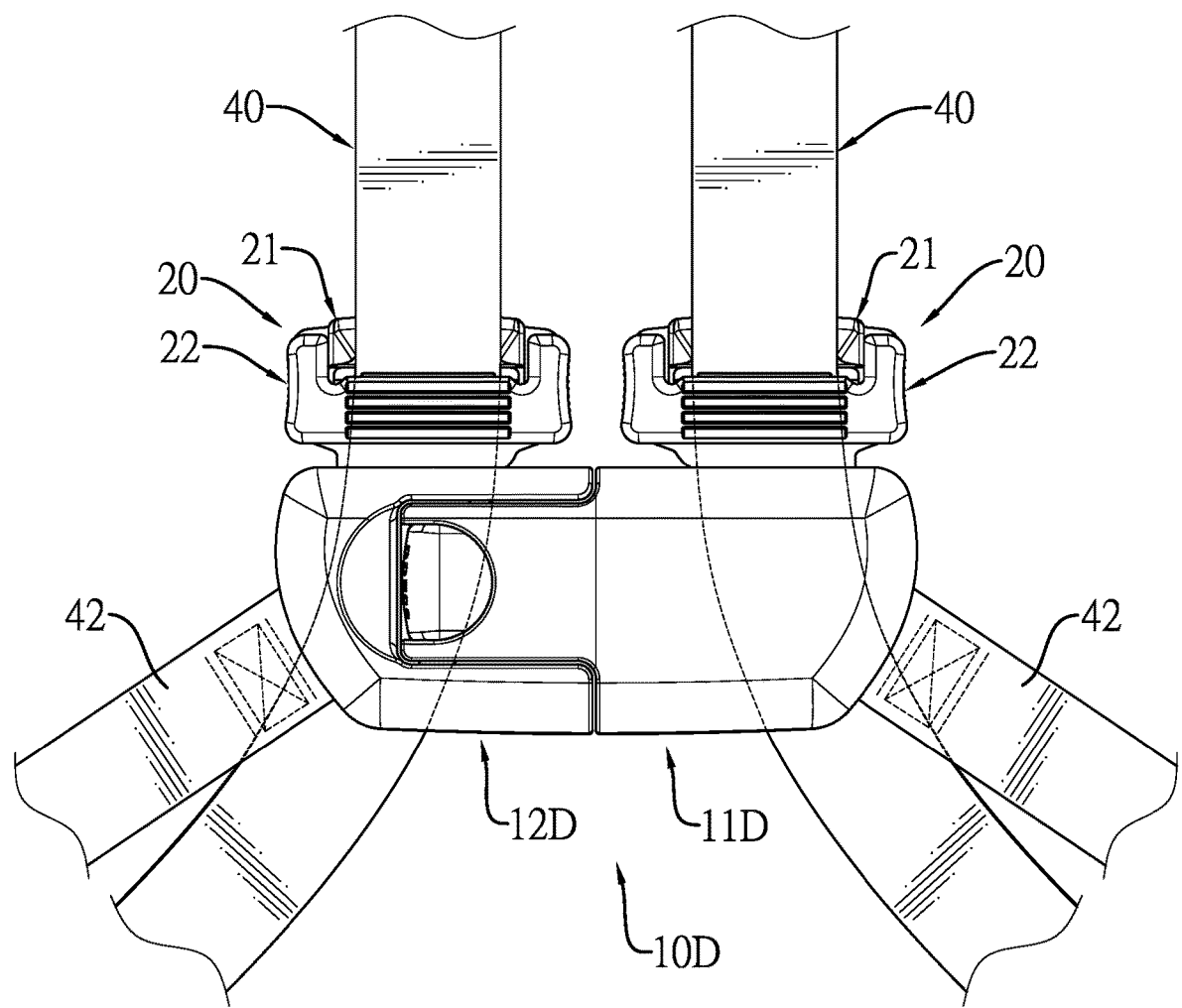
FIG. 20 is an enlarged front view of the first embodiment of the six-point seat belt assembly in FIG. 18 when the buckle assembly is fastened.
Figure 21:
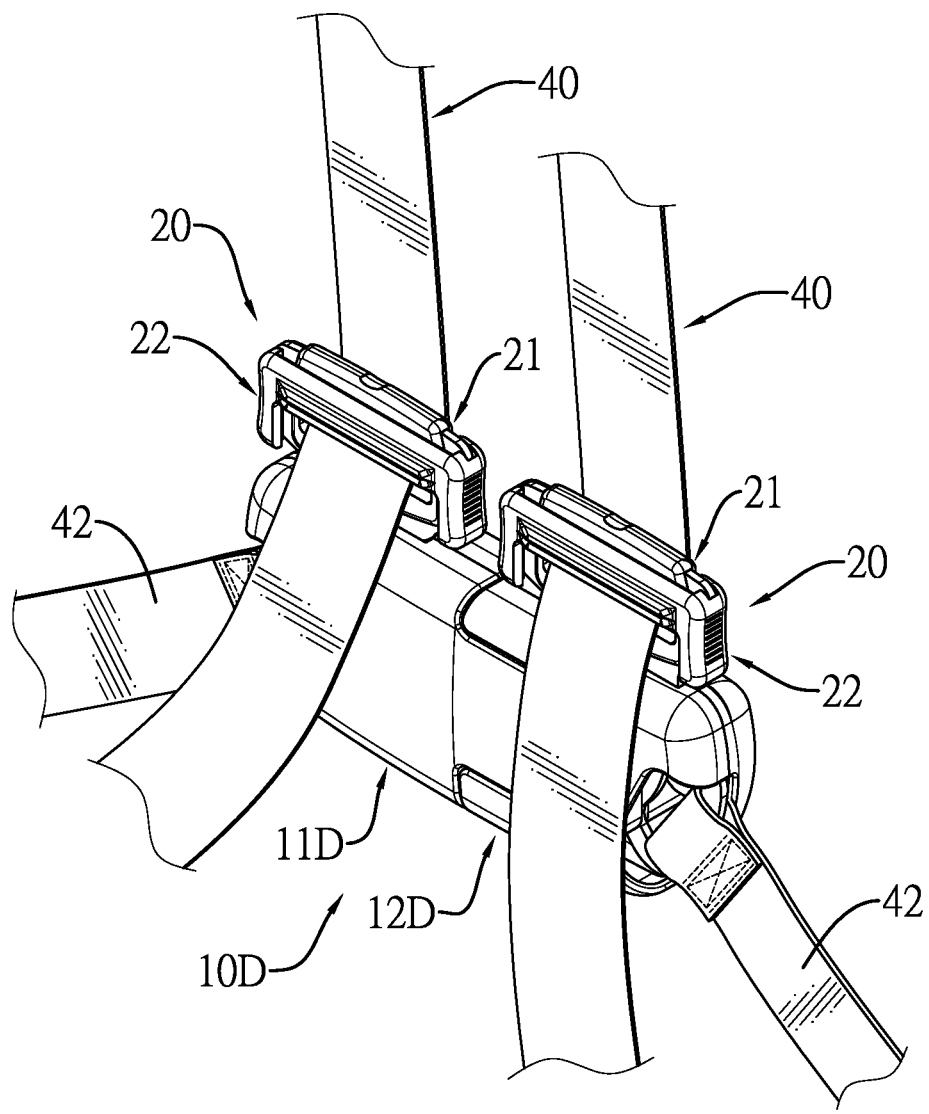
FIG. 21 is an enlarged perspective view of the six-point seat belt assembly in FIG. 18 when the buckle assembly is fastened.
Figure 22:
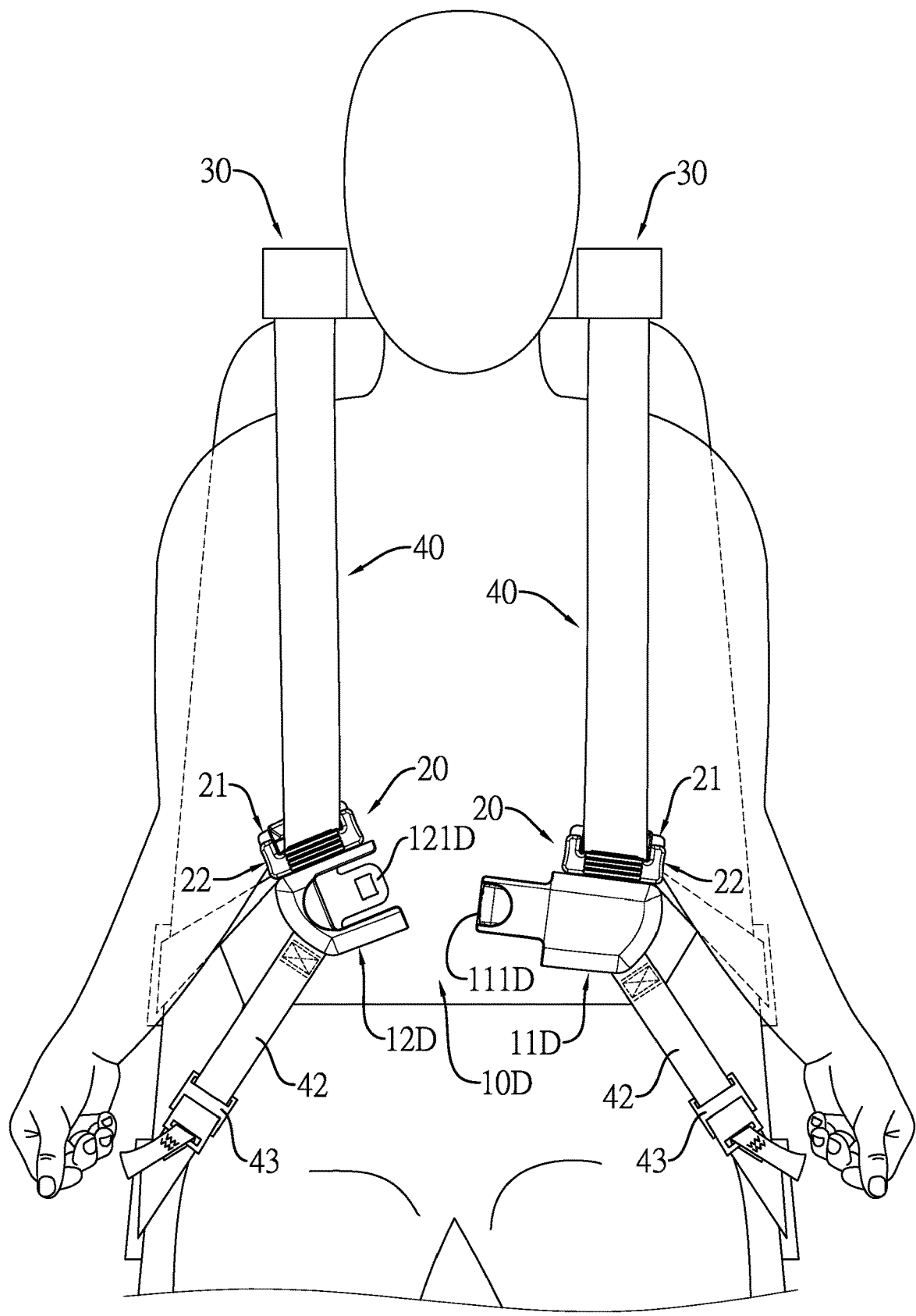
FIG. 22 is an enlarged operational front view of the first embodiment of the six-point seat belt assembly in FIG. 18 when the buckle assembly is released.
Figure 23:
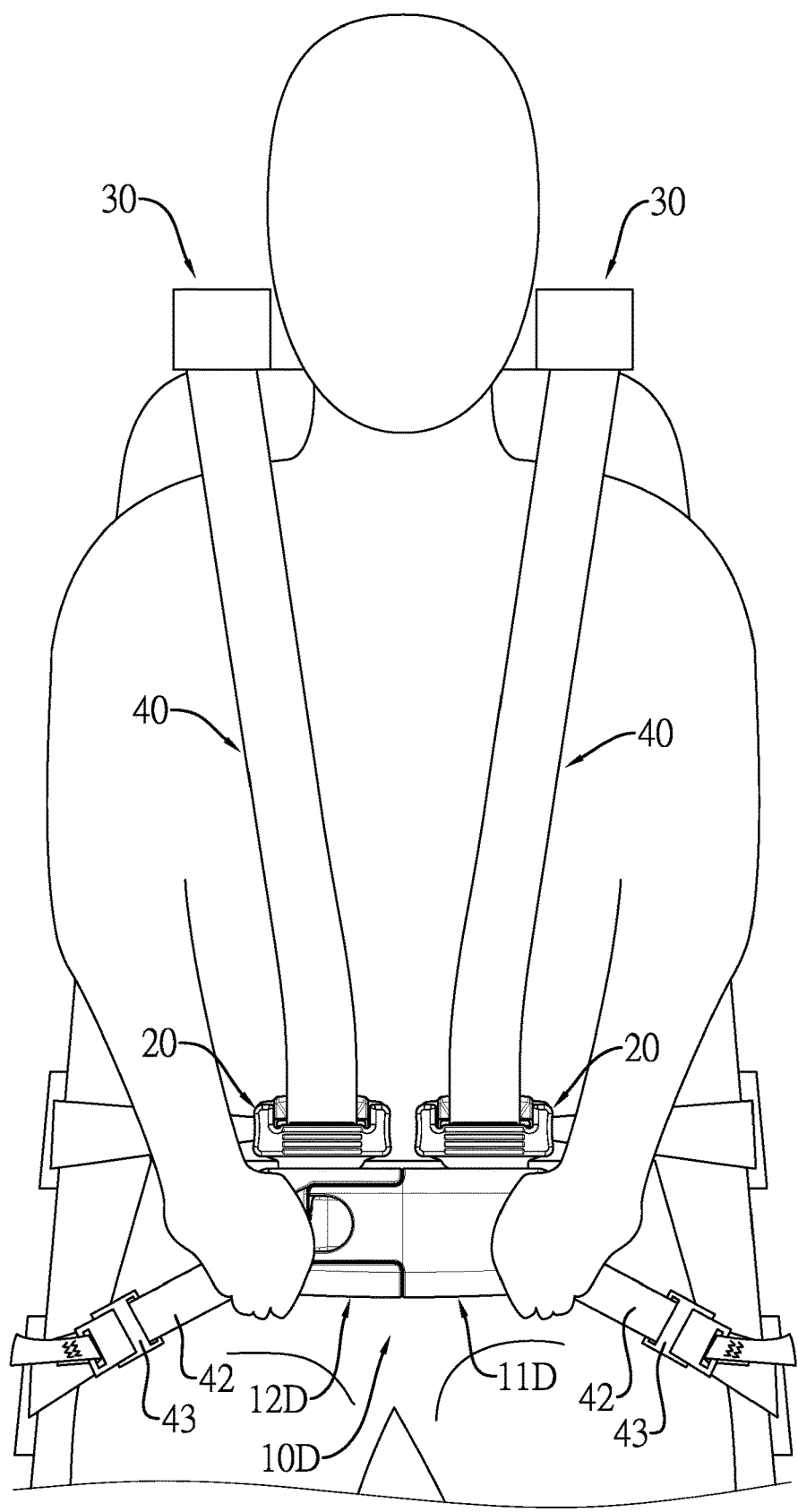
FIG. 23 is another enlarged operational front view of the first embodiment of the six-point seat belt assembly in FIG. 18 when the buckle assembly is fastened.

With reference to FIGS. 18, 22, and 23, after the connecting segment 121D of the tongue member 12D is inserted into the tongue slot 111D in the buckle member 11D, the lengths of the auxiliary webbings 42 can be adjusted by the adjusting members 43. Accordingly, the six-point seat belt assembly 1D can securely hold a driver or a passenger in position.

Figure 24:
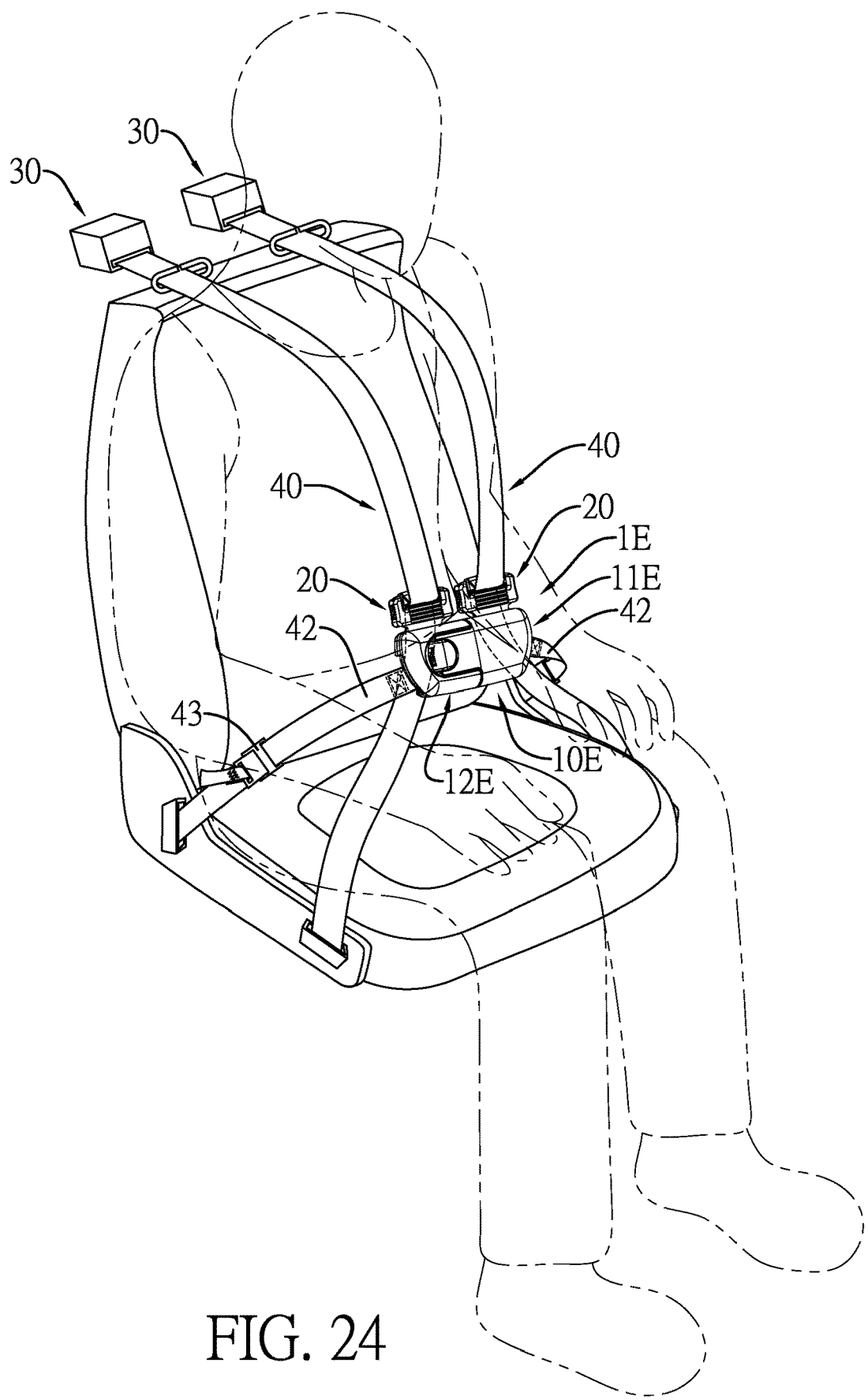
FIG. 24 is an operational perspective view of a second embodiment of a six-point seat belt assembly in accordance with the present invention mounted on a vehicle seat.

With reference to FIG. 24, in the second embodiment, a six-point seat assembly 1E is provided to provide an enhanced protecting effect to a driver or a passenger.

The second embodiment of the six-point seat belt assembly 1E comprises a buckle assembly 10E, two webbing-locking mechanisms 20, at least one retractor 30, two main webbings 40, and two auxiliary webbings 42 and has a structure similar to that in the first embodiment of the six-point seat belt assembly 1D. The buckle assembly 10E comprises a buckle member 11E and a tongue member 12E. Two retractors 30 are implemented and mounted respectively on two sides of a top end of a backrest of a vehicle seat. Bottom ends of the two main webbings 40 are connected securely and respectively with two sides of a front end of the vehicle seat. Bottom ends of the two auxiliary webbings 42 are connected securely and respectively with two sides of the vehicle seat. The at least one retractor 30 may be implemented as one or two in amount. Each webbing-locking mechanism 20 may be the one shown in FIGS. 8 to 11, so the detailed description thereof is omitted. The differences between the second embodiment and the first embodiment of the six-point seat belt assembly 1D,1E are the positions of the bottom ends of the main webbings 40 and the auxiliary webbings 42.

Figure 25:
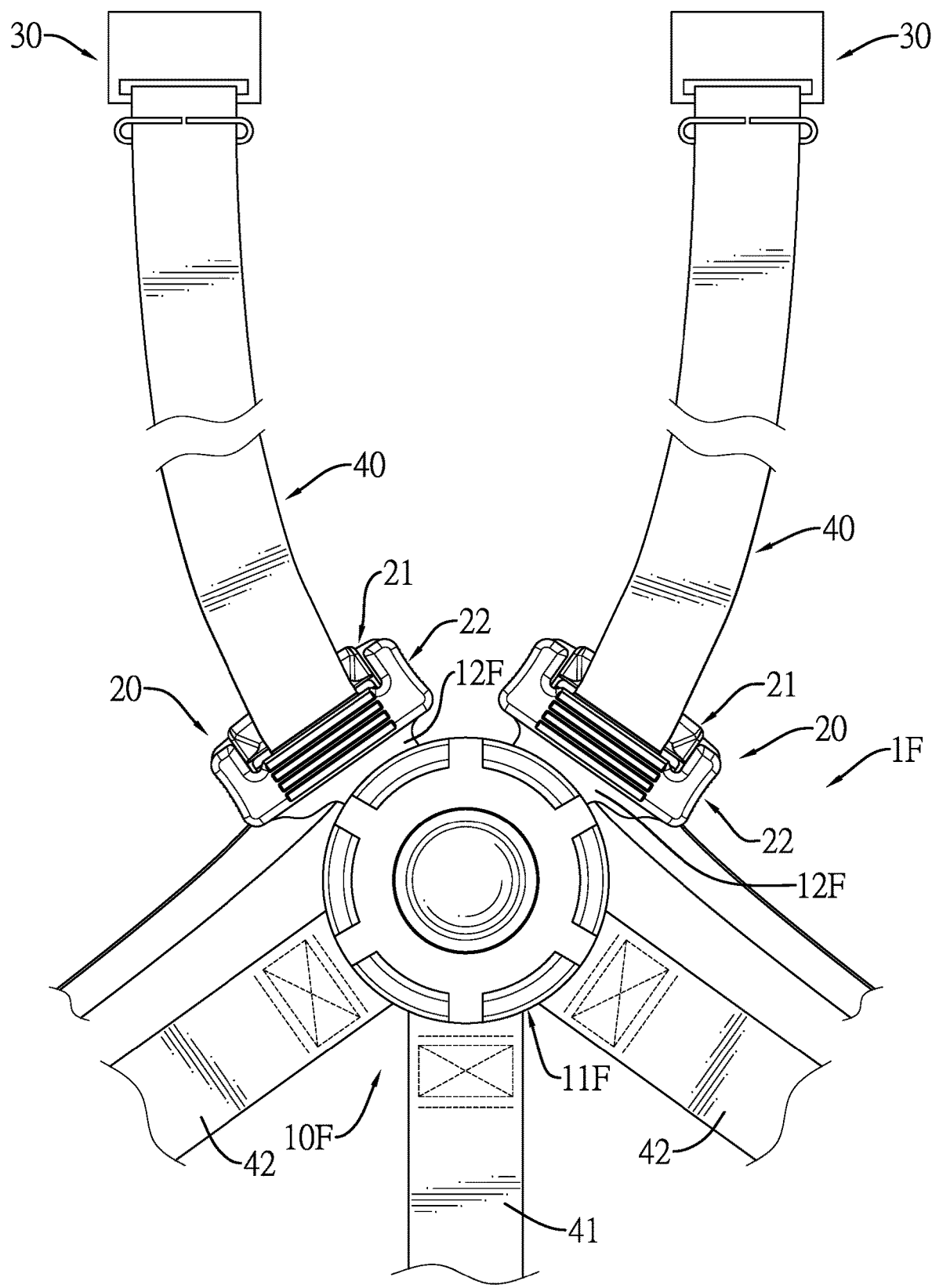
FIG. 25 is a front view of a seven-point seat belt assembly in accordance with the present invention.
Figure 26:
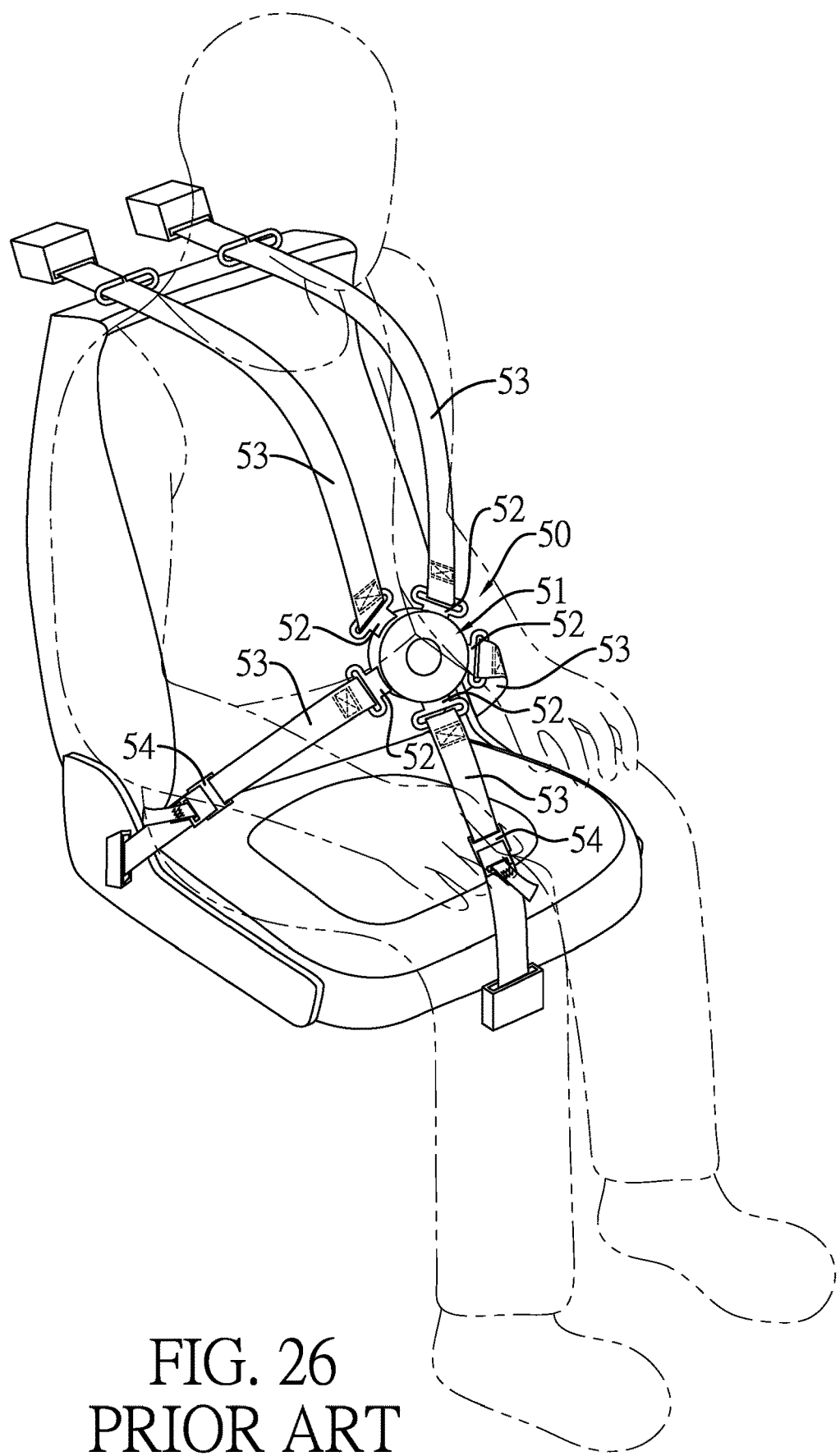
FIG. 26 is an operational perspective view of a conventional five-point seat belt assembly mounted on a vehicle seat.
Figure 27:
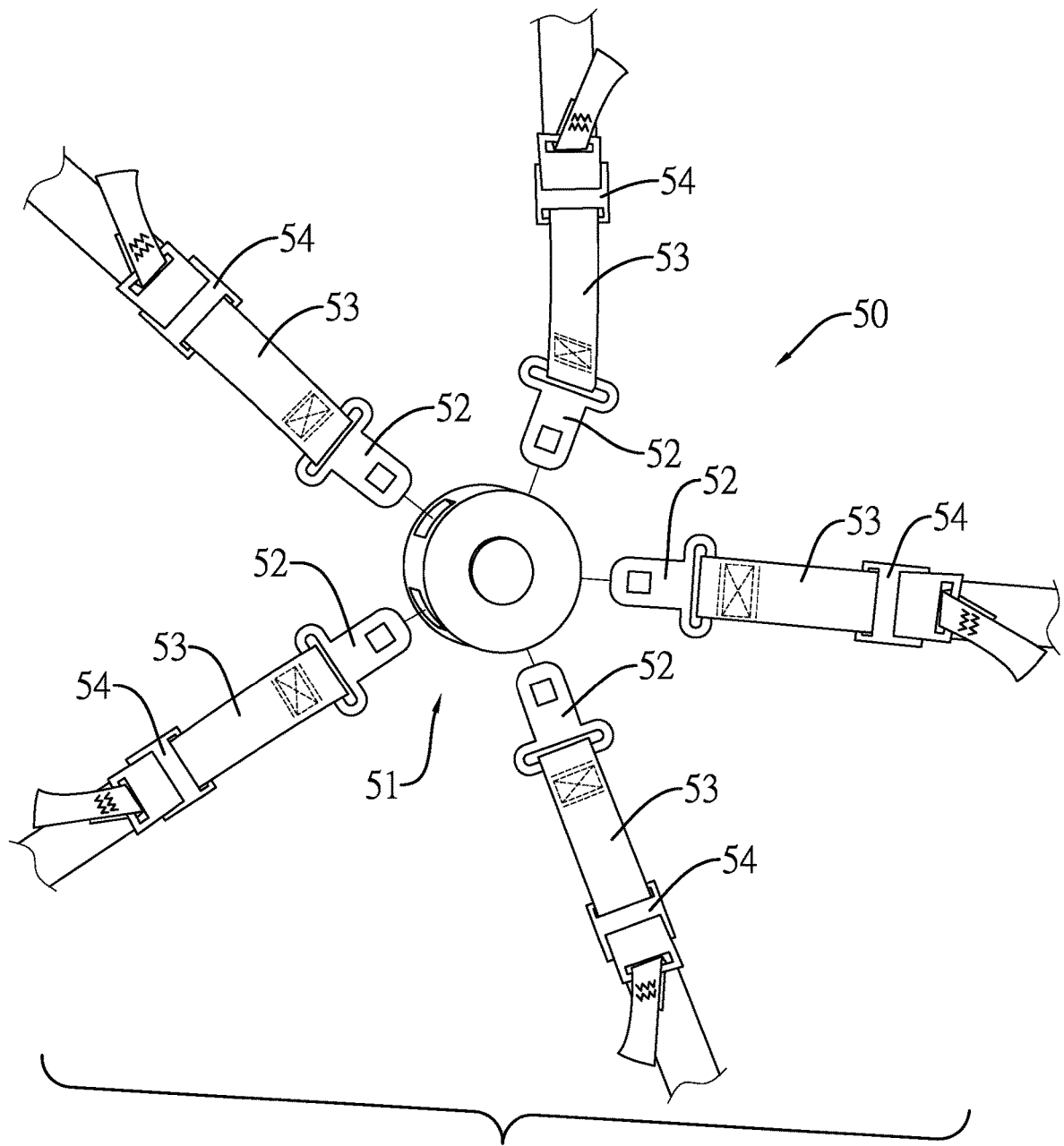
FIG. 27 is an enlarged exploded perspective view of the conventional five-point seat belt assembly in Fig, 26 when the buckle assembly is released.
Figure 28:
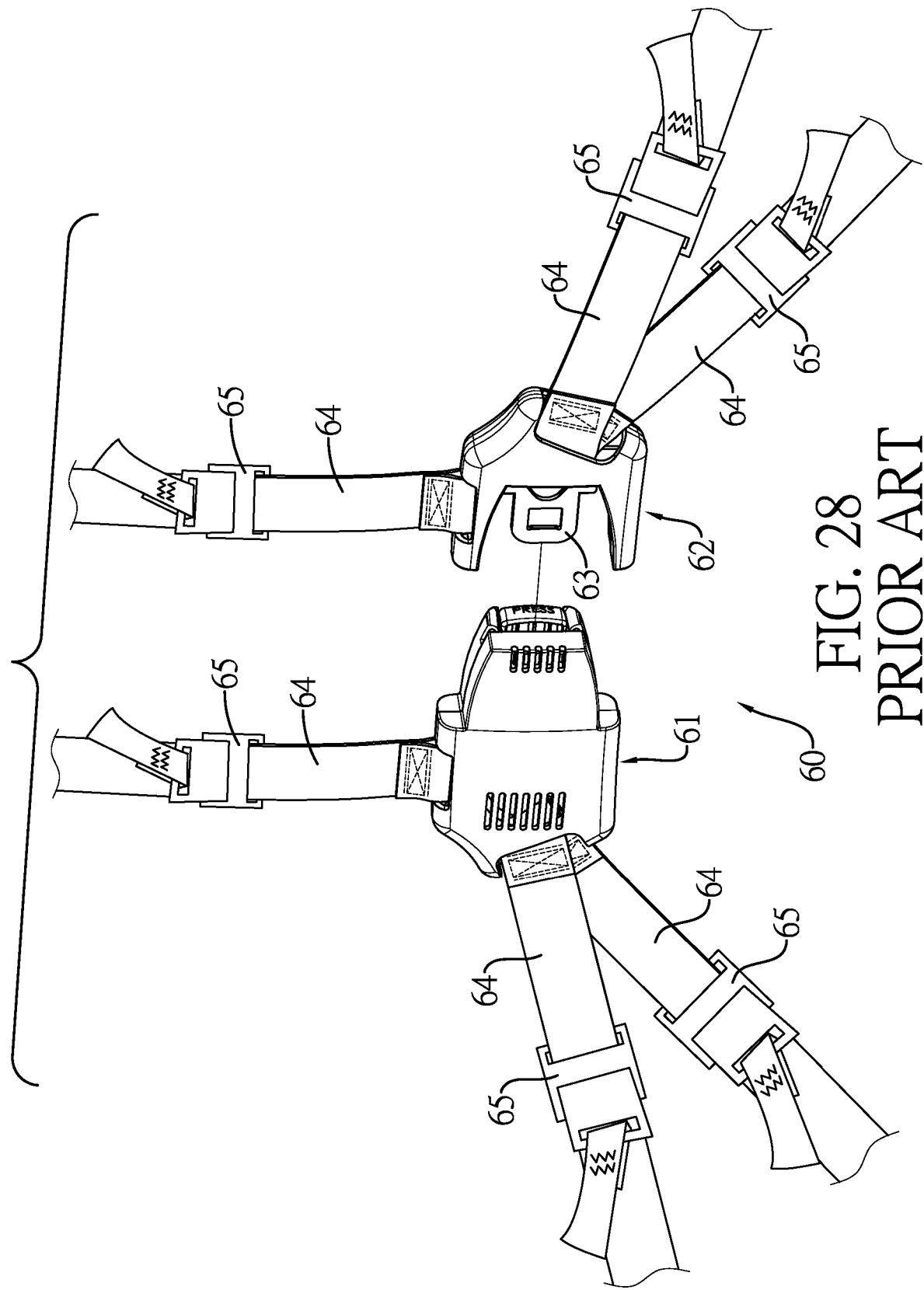
FIG. 28 is an exploded perspective view of a conventional six-point seat belt assembly when the buckle assembly is released.

With reference to FIG. 25, a seven-point seat belt assembly 1F is provided and comprises a buckle assembly 10F, two webbing-locking mechanisms 20, at least one retractor 30, two main webbings 40, a connecting webbing 41, and two auxiliary webbings 42.

The webbing-locking mechanisms 20, the at least one retractor 30, and the main webbings 40 in the seven-point seat belt assembly 1F may be same as those in the first embodiment of the five-point seat belt assembly 1B as shown in FIGS. 12 to 14. The at least one retractor 30 may be implemented as one or two in amount. Each webbing-locking mechanism 20 may be the one shown in FIGS. 8 to 11, so the detailed description thereof is omitted. Top ends of the two auxiliary webbings 42 are connected with a bottom of the buckle member 11F, and bottom ends of the two auxiliary webbings 42 are connected respectively with two sides of a front end of the vehicle seat. Each auxiliary webbing 42 may further have an adjusting member 43 to adjust the length of the auxiliary webbing 42. Consequently, the two auxiliary webbings 42 can securely hold the two thighs of a user respectively, such that the safety of using the seat belt assembly can be improved.

With such an arrangement, the two main webbings 40 of the multi-point seat belt assembly in accordance with the present invention are mounted respectively through the webbing-locking mechanisms 20, and two ends of each main webbing 40 are connected respectively with a retractor 30 and a side of a vehicle seat. When the multi-point seat belt assembly is correctly buckled and the locking mechanisms in the retractors 30 are locked due to emergency brake or initiation of tilt-lock mechanism, the webbing-locking mechanisms 20 will provide a unidirectional locking effect to the main webbings 40 due to the change of the tension of the main webbings 40. Accordingly, the body of a driver or a passenger can be securely held on the vehicle seat by the main webbings to protect the driver or the passenger.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-point seat belt assembly comprising:
   a buckle assembly comprising
      a buckle member; and
      a tongue member detachably inserted into the buckle member;
   two webbing-locking mechanisms mounted on the buckle assembly, each webbing-locking mechanism comprising a connecting member and a movable member mounted moveably on the connecting member, wherein the connecting members of the two webbing-locking mechanisms are connected respectively with the buckle member and the tongue member;
   two main webbings mounted respectively through the webbing-locking mechanisms, each main webbing having a first end and a second end; and
   at least one retractor connected with the first ends of the two main webbings;
   wherein each one of the two main webbings has a tension to change a position of the movable member of a respective one of the two webbing-locking mechanisms relative to the connecting member of the webbing-locking mechanism to lock the main webbing in a unidirectional manner by the corresponding webbing-locking mechanism such that the first end and the second end form an angle larger than or equal to 90 degrees to provide at least four securing points;

wherein the connecting member of each webbing-locking mechanism has a through hole defined through the connecting member, a front side, and a rear side opposite the front side;

wherein the movable member of each webbing-locking mechanism comprises a front portion located at the front side of the connecting member of the webbing-locking mechanism and having a limiting protrusion formed on and protruding from the front portion and extending slidably in the through hole in the connecting member; and a rear portion located at the rear side of the connecting member of the webbing-locking mechanism, and the front portion and the rear portion have a height difference between each other;

wherein each main webbing passes through the through hole in the connecting member of a corresponding one of the webbing-locking mechanisms via a space defined between the connecting member and a front end of the front portion of the movable member of the corresponding webbing-locking mechanism and passes a bottom of the rear portion of the movable member of the corresponding webbing-locking mechanism.

2. The multi-point seat belt assembly as claimed in claim 1 further comprising two auxiliary webbings connected respectively with the buckle member and the tongue member.

3. The multi-point seat belt assembly as claimed in claim 2, wherein each auxiliary webbing has an adjusting member mounted on the auxiliary webbing.

* * * * *